(12) United States Patent
Watanabe et al.

(10) Patent No.: US 8,073,143 B2
(45) Date of Patent: Dec. 6, 2011

(54) INFORMATION PROCESSING DEVICE AND METHOD

(75) Inventors: Ayako Watanabe, Kanagawa (JP); Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1440 days.

(21) Appl. No.: 10/596,038

(22) PCT Filed: Jan. 27, 2005

(86) PCT No.: PCT/JP2005/001147
§ 371 (c)(1),
(2), (4) Date: May 25, 2006

(87) PCT Pub. No.: WO2005/074187
PCT Pub. Date: Aug. 11, 2005

(65) Prior Publication Data
US 2007/0162978 A1    Jul. 12, 2007

(30) Foreign Application Priority Data
Jan. 29, 2004    (JP) ............... P2004-020827

(51) Int. Cl.
*H04L 9/00* (2006.01)
*H04L 9/20* (2006.01)
*H04L 9/30* (2006.01)

(52) U.S. Cl. ........ 380/277; 380/278; 380/279; 380/259; 380/200; 380/47; 380/44; 380/28; 380/29; 713/171; 713/168; 705/71; 725/30; 725/31; 726/26; 726/30; 726/31; 726/32; 726/33

(58) Field of Classification Search .................. None
See application file for complete search history.

(56) References Cited

U.S. PATENT DOCUMENTS

| | | | | |
|---|---|---|---|---|
| 5,917,910 A | * | 6/1999 | Ishiguro et al. | 705/57 |
| 6,453,420 B1 | | 9/2002 | Collart | |
| 6,938,162 B1 | * | 8/2005 | Nagai et al. | 713/189 |
| 7,340,055 B2 | * | 3/2008 | Hori et al. | 380/201 |

(Continued)

FOREIGN PATENT DOCUMENTS

EP    1 338 989    8/2003

(Continued)

OTHER PUBLICATIONS

"Joho Capsule Ryutsu ni Okeru Riyosha System Hogo" Information Processing Society of Japan Kenkyu Hokoku, vol. 2001, No. 15, Feb. 20, 2001, pp. 13-108, particularly, 2.1 Joho Capsule to sono Ryutsu Framework, 3.3. Ninsho o Sansho.

(Continued)

*Primary Examiner* — Syed A. Zia
(74) *Attorney, Agent, or Firm* — K&L Gates LLP

(57) ABSTRACT

A configuration is provided which enables usage management and secure data management of data newly generated or obtained that is different from data already stored in an information recording medium. New data such as information which the user has newly generated or downloaded related to content information increments of content management information stored in an information recording medium is recorded as configuration data of the content management unit, in the form of encrypted data to which a unit key corresponding to the content management unit, or a unit key corresponding to a new content management unit, has been applied. According to this configuration, secure data management and usage management is realized for new data the same as with data corresponding to original units.

30 Claims, 21 Drawing Sheets

U.S. PATENT DOCUMENTS

| | | | |
|---|---|---|---|
| 7,401,231 B2 * | 7/2008 | Taki et al. .................... | 713/193 |
| 7,506,367 B1 * | 3/2009 | Ishibashi ...................... | 726/10 |
| 7,512,959 B2 * | 3/2009 | Ferren et al. ................. | 720/719 |
| 7,533,224 B2 * | 5/2009 | Takashima .................... | 711/154 |
| 7,536,727 B2 * | 5/2009 | Kojima et al. ................. | 726/31 |
| 7,596,073 B2 * | 9/2009 | Ferren et al. ................. | 369/275.1 |
| 7,668,844 B2 * | 2/2010 | Kim et al. ..................... | 707/999.1 |
| 7,706,664 B2 * | 4/2010 | Isozaki et al. ................. | 386/334 |
| 7,770,028 B2 * | 8/2010 | Ferren et al. .................. | 713/193 |
| 2002/0019948 A1 | 2/2002 | Katou et al. | |
| 2002/0064111 A1 | 5/2002 | Horie | |
| 2002/0154779 A1 | 10/2002 | Asano et al. | |
| 2002/0159592 A1 | 10/2002 | Hidecki et al. | |
| 2002/0178372 A1 | 11/2002 | Saito | |
| 2003/0032486 A1 | 2/2003 | Elliott | |
| 2003/0072453 A1 | 4/2003 | Patrick et al. | |
| 2003/0084281 A1 | 5/2003 | Abiko et al. | |
| 2003/0185128 A1 * | 10/2003 | Shoji et al. .................. | 369/59.25 |
| 2003/0226026 A1 | 12/2003 | Magoshi | |
| 2004/0213092 A1 * | 10/2004 | Ueda et al. .................. | 369/30.03 |
| 2004/0236588 A1 | 11/2004 | Millard et al. | |
| 2005/0105888 A1 * | 5/2005 | Hamada et al. .............. | 386/95 |
| 2006/0067529 A1 | 3/2006 | Kojima ........................ | 380/201 |
| 2007/0067622 A1 * | 3/2007 | Nakano et al. ............... | 713/163 |
| 2007/0230297 A1 * | 10/2007 | Kitani .......................... | 369/47.1 |
| 2008/0285757 A1 * | 11/2008 | Bradley et al. ............... | 380/278 |
| 2009/0168996 A1 * | 7/2009 | Candelore ..................... | 380/29 |

FOREIGN PATENT DOCUMENTS

| | | |
|---|---|---|
| EP | 1 538 621 | 6/2005 |
| GB | 2 373 597 | 11/2002 |
| JP | HEI 11-144322 | 5/1999 |
| JP | 2000-332742 | 11/2000 |
| JP | 2001-23299 | 1/2001 |
| JP | 2001-209583 | 8/2001 |
| JP | 2001-325747 | 11/2001 |
| JP | 2001-350664 | 12/2001 |
| JP | 2002-049518 | 5/2002 |
| JP | 2002-190157 | 7/2002 |
| JP | 2002-542566 | 12/2002 |
| JP | 2003-131949 | 5/2003 |
| JP | 2004-530241 | 9/2004 |
| WO | WO 02/067125 | 8/2002 |
| WO | 2004/114303 | 12/2004 |

OTHER PUBLICATIONS

Juraigata Denshi Mall o Kakucho shita Online Contents Hanbai System, Information Processing Society of Japan Kenkyu Hokoku, vol. 99, No. 11, Jan. 30, 1999, pp. 87 to 93, particularly, 4.3.1. Kenri Hogo Contents Kozo, 4.4.1. Secure Container Kozo o Sansho.

"NGI Project (8) Contents no Casule-Ka to Access Seigyo", UNIX Megazine, vol. 15, No. 9, Sep. 1, 2000, pp. 158 to 166, all pages.

European Search Report Corresponding to 05709421.1-2223 dated Mar. 31, 2009.

Taniguchi et al., "User System Protection Mechanism for Capsule-based Information Trans-use Framework", NTT Cyber Space Laboratories, Feb. 21, 2001.

Tomita et al., Digital Sales System for Internet Shopping Mall, Systems Development Laboratory Hitachi, Ltd., Jan. 30, 1999.

Japanese Office Action dated Jun. 21, 2011, for corresponding Japanese Appln. No. 2005-517494.

* cited by examiner

FIG. 16
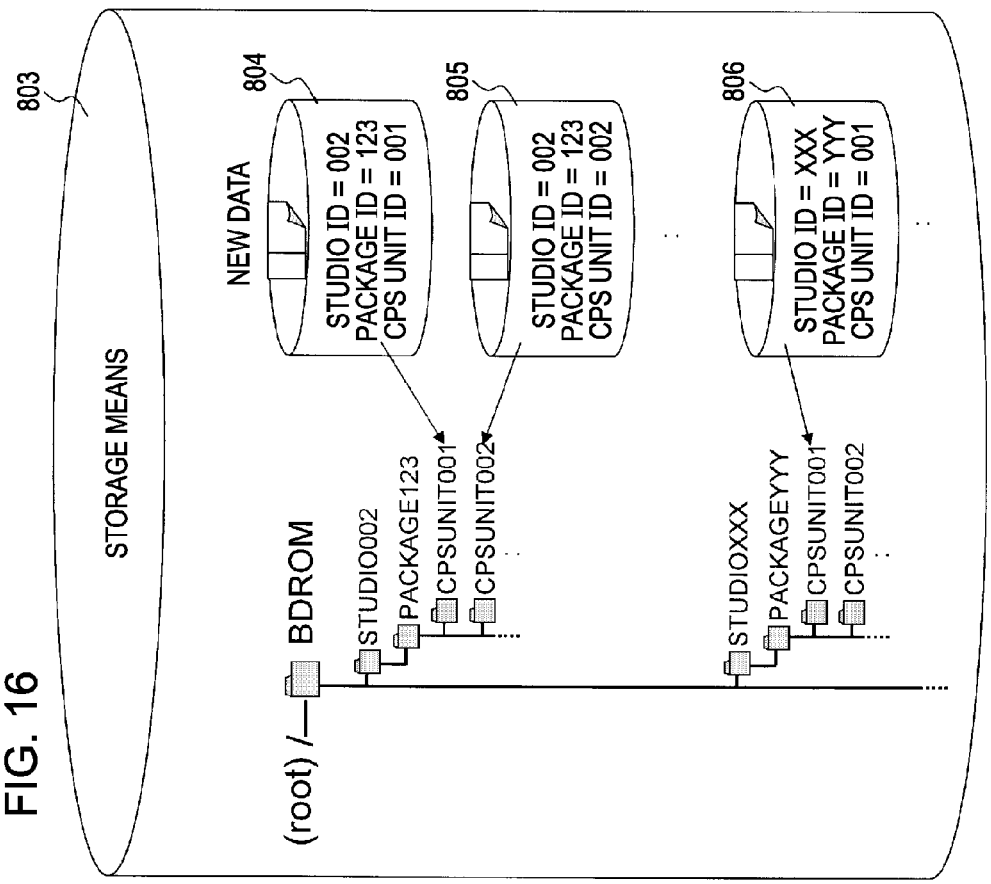
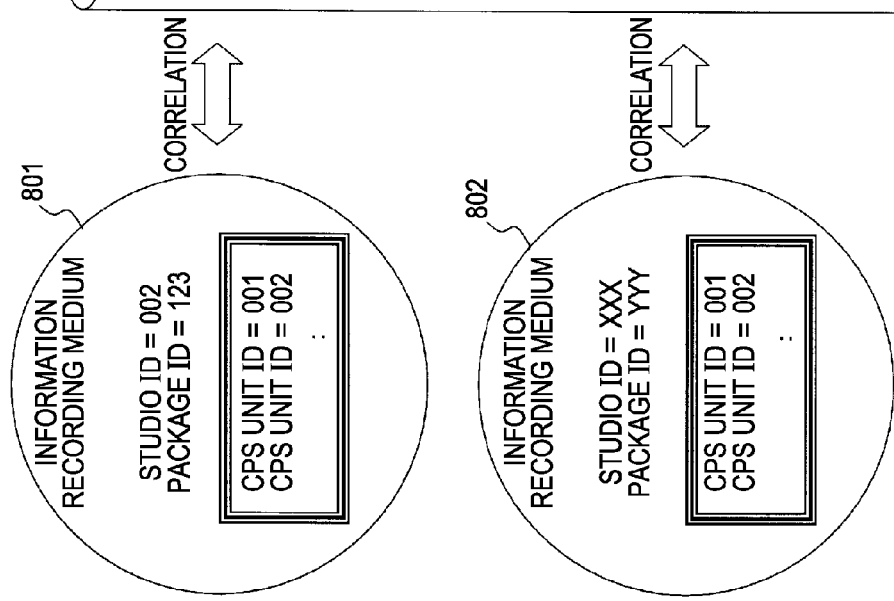

INFORMATION PROCESSING DEVICE AND METHOD

CROSS REFERENCE TO RELATED APPLICATIONS

The present application claims priority to Japanese Patent Document No. P2004-020827 filed on Jan. 29, 2004, the disclosure of which is herein incorporated by reference.

BACKGROUND

The present invention relates to an information processing device, an information processing method, and a computer program. More particularly, the present invention relates to an information processing device, an information processing method, and a computer program, wherein information, newly generated or downloaded by a user in relation to content information stored in an information recording medium in increments of units, is recorded as managed data corresponding to the units, with secure data management and usage management being realized for each unit of the newly generated data as well.

Various kinds of software data, such as audio data like music and so forth, picture data like movies and so forth, game programs, various kinds of application programs, and so on (hereafter collectively referred to as "content"), can be stored in recording media, such as Blu-ray disks which use blue laser, or DVDs (Digital Versatile Disc), MDs (Mini Disc), CDs (Compact Disk), or the like, as digital data. Particularly, Blu-ray disks which use blue laser are capable of high-density recording, and can record great amounts of picture contents and the like as high-definition data.

Digital contents are stored in such various types of information recording media, and are provided to the user. The user reproduces and uses the contents using a reproducing device such as a PC (Personal Computer), and disk player, or the like.

With many contents, such as music data, image data, and the like, generally, the distribution rights thereof are held by the author or vendor. Accordingly, an arrangement is generally made such that certain usage restrictions are applied to distribution of such contents, i.e., so that only authorized users can use the contents, and that unauthorized duplications and so forth are not made.

With digital recording devices and recording media, data can be repeatedly recorded and reproduced without deterioration in image quality or audio quality, for example, and accordingly, there is the problem of widespread distribution of unauthorized copies of contents via the Internet, so-called bootleg disks wherein contents are copied to CD-Rs or the like, and usage of copied contents stored on hard disks of PCs and the like.

Large-capacity recording media such as DVDs, and blue-laser recording media developed in recent years, are capable of storing great amounts of digital information, one to several movies worth on one disk, for example. The capability to record such picture information and the like as digital information makes preventing unauthorized copies to protect copyright holders an even more important issue. Heretofore, various techniques have been put into practice for preventing unauthorized copying with digital recording device and recording media, in order to protect such unauthorized copying of digital data.

For example, Content Scramble System is used with DVD players. With Content Scramble System, video data, audio data, etc., is recorded in a DVD-ROM (Read Only Memory) in an encrypted form, and a key to be used for decrypting the encrypted data is provided to a licensed DVD player. A license is provided to a DVD player designed to follow predetermined action stipulations, such as not performing unauthorized copying and so forth. Accordingly, licensed DVD players can reproduce the images and audio from the DVD-ROM by using the key provided thereto to decrypt the encrypted data recorded in the DVD-ROM.

On the other hand, unlicensed DVD players do not have a key for decrypting the encrypted data, and accordingly cannot decrypt the encrypted data recorded in the DVD-ROM. Thus, DVD players which to not satisfy conditions required at the time of licensing cannot reproduce from the DVD-ROM storing digital data, thereby preventing unauthorized copying.

In this way, a management system for content stored in information recording media has been established. However, secure data management and usage management is far from being realized regarding data generated by a user executing a program stored in information recording media as content, and data content obtained from external servers, and so forth.

In the event of performing secure management of data generated by users executing programs stored in information recording media and data content obtained from external servers, individual data needs to be handled by the user protecting with his/her own password, applying an encryption key externally obtained to create encrypted data, and so forth. Such a data management configuration results in the problem of an increased number of encryption keys and passwords to manage in the event that generated data and obtained data increases, the location of data readily becomes unclear, and further the correlation of stored data and encryption keys/passwords also becomes unclear. Another current issue is that sufficient measures are not implemented regarding such new data.

SUMMARY

Problems to be Solved by the Invention

The present invention has been made in light of the above, and accordingly it is an object thereof to provide an information processing device, an information processing method, and a computer program, for recording new data such as information which a user has generated or information which has been downloaded newly in relation to content information in increments of units stored in an information recording medium, as managed data corresponding to the units, so as to realize secure data management and usage management of newly-generated data as well.

Means for Solving the Problems

According to a first aspect of the present invention, an information processing device comprises:

a recording medium interface for executing reading of data from an information recording medium; and a data processing unit for executing recording processing of new data either generated or obtained applying information obtained from the information recording medium;

wherein the information recording medium is an information recording medium storing recorded data in increments of content management units including encrypted data encrypted by unit keys each of which are set as different encryption keys;

and wherein the data processing unit obtains a unit key corresponding to a content management unit to which the obtained information belongs or a unit key corresponding to a new content management unit, executes encryption processing of the new data applying the obtained unit key, and executes recording processing with the generated encrypted data as data configuring the content management unit.

Further, according to an embodiment of the information processing device according to the present invention, the data processing unit is configured to set a content management unit corresponding to the new data, and also execute setting processing for an encryption key serving as management information corresponding to the content management unit including the new data.

Further, according to an embodiment of the information processing device according to the present invention, the data processing unit is configured to set a content management unit corresponding to the new data, and also execute setting processing for content usage control information serving as management information corresponding to the content management unit including the new data.

Further, according to an embodiment of the information processing device according to the present invention, the data processing unit is configured to execute writing processing of the new data to a region stipulated by a program included in the information obtained from the information recording medium.

Further, according to an embodiment of the information processing device according to the present invention, the data processing unit is configured to, in a case of storing the new data in storage means other than an information recording medium from which the obtained information has been obtained, execute processing for storing the new data correlated with identification information of the information recording medium from which the obtained information has been obtained.

Further, according to an embodiment of the information processing device according to the present invention, the data processing unit is configured to execute encryption processing of an AV stream data file including new data and a navigation file including control information or a program to be applied to playing processing of the AV stream data, and to execute recording processing of new data to storage means.

Further, according to an embodiment of the information processing device according to the present invention, the data processing unit is configured to apply a unit key corresponding to a content management unit as an encryption key to be applied to the encryption processing.

Further, according to an embodiment of the information processing device according to the present invention, the data processing unit is configured to execute encryption processing applying, as an encryption key or encryption key generating information, information which can only be obtained by an application licensed to execute processing regarding the content management unit.

Further, according to an embodiment of the information processing device according to the present invention, the information which can only be obtained by a licensed application is information including a device ID as an identifier unique to the device in which the application is installed.

Further, according to an embodiment of the information processing device according to the present invention, the data processing unit is configured to generate a hash value for tampering verification with regard to at least one of an AV stream data file including new data, and a navigation file including control information or a program to be applied to playing processing of the AV stream data, and to record the hash value in storage means.

Further, according to an embodiment of the information processing device according to the present invention, the data processing unit is configured to execute data tampering verification processing based on the hash value set for an AV stream data file including new data or a navigation file, at the time of using the file, and executes usage processing of the files under the condition that there is no tampering.

Further, according to an embodiment of the information processing device according to the present invention, the data processing unit is configured to execute recording processing of a navigation file, including control information or a program to be applied to playing processing of AV stream data including new data, to storage means, as a file to which an electronic signature has been appended for tampering verification.

Further, according to an embodiment of the information processing device according to the present invention, the data processing unit is configured to execute data tampering verification processing based on the electronic signature set for the AV stream data file including new data or the navigation file, at the time of using the file, and executes usage processing of the files under the condition that there is no tampering.

Further, according to a second aspect of the present invention, an information processing device comprises:

a recording medium interface for executing reading of data from an information recording medium; and a data processing unit for executing processing of a program included in information read from the information recording medium;

wherein the data processing unit is configured to determine the type of the information recording medium from which the program has been read, and to execute the program under the condition that the program is of a type regarding which execution permission has been set beforehand.

Further, according to an embodiment of the information processing device according to the present invention, the data processing unit is configured to obtain, from information read from the information recording medium, type information of information recording media regarding which program execution is permitted, and to execute program execution permitted/not-permitted determination in accordance with the obtained information.

Further, according to a third aspect of the present invention, an information processing method comprises:

a data reading step for reading of data from an information recording medium; and a data processing step for executing recording processing of new data either generated or obtained applying information obtained from the information recording medium;

wherein the information recording medium is an information recording medium storing recorded data in increments of content management units including encrypted data encrypted by unit keys each of which are set as different encryption keys;

and wherein the data processing step includes an obtaining step for obtaining a unit key corresponding to a content management unit to which the obtained information belongs or a unit key corresponding to a new content management unit, a step for executing encryption processing of the new data applying the obtained unit key, and a step for executing recording processing with the generated encrypted data as data configuring the content management unit.

Further, according to an embodiment of the information processing method according to the present invention, the data processing step includes a step for setting of a content management unit corresponding to the new data, and also executing of setting processing for an encryption key serving as management information corresponding to the content management unit including the new data.

Further, according to an embodiment of the information processing method according to the present invention, the data processing step includes a step for setting of a content management unit corresponding to the new data, and also executing setting processing for content usage control information serving as management information corresponding to the content management unit including the new data.

Further, according to an embodiment of the information processing method according to the present invention, the data processing step includes a step for executing writing processing of the new data to a region stipulated by a program included in the information obtained from the information recording medium.

Further, according to an embodiment of the information processing method according to the present invention, in a case of storing the new data in storage means other than an information recording medium from which the obtained information has been obtained, the data processing step executes processing for storing the new data correlated with identification information of the information recording medium from which the obtained information has been obtained.

Further, according to an embodiment of the information processing method according to the present invention, the information processing method further comprises an encryption recording processing step of encryption processing of an AV stream data file including new data and a navigation file including control information or a program to be applied to playing processing of the AV stream data, and executing recording processing of new data to storage means.

Further, according to an embodiment of the information processing method according to the present invention, the encryption recording processing step is a step for executing encryption processing, applying a unit key corresponding to a content management unit as an encryption key to be applied to the encryption processing.

Further, according to an embodiment of the information processing method according to the present invention, the encryption recording processing step is a step for executing encryption processing, applying, as an encryption key or encryption key generating information, information which can only be obtained by an application licensed to execute processing regarding the content management unit.

Further, according to an embodiment of the information processing method according to the present invention, the information which can only be obtained by a licensed application is information including a device ID as an identifier unique to the device in which the application is installed.

Further, according to an embodiment of the information processing method according to the present invention, the information processing method further comprises a step for generating of a hash value for tampering verification with regard to at least one of an AV stream data file including new data, and a navigation file including control information or a program to be applied to playing processing of the AV stream data, and recording of the hash value in storage means.

Further, according to an embodiment of the information processing method according to the present invention, the information processing method further comprises a step for executing data tampering verification processing based on the hash value set for the AV stream data file including new data or the navigation file, at the time of using the file, and executing of usage processing of the files under the condition that there is no tampering.

Further, according to an embodiment of the information processing method according to the present invention, the information processing method further comprises a step for executing recording processing of a navigation file, including control information or a program to be applied to playing processing of AV stream data including new data, to storage means, as a file to which an electronic signature has been appended for tampering verification.

Further, according to an embodiment of the information processing method according to the present invention, the information processing method further comprises a step for executing data tampering verification processing based on the electronic signature set for the AV stream data file including new data or the navigation file, at the time of using the file, and executing of usage processing of the files under the condition that there is no tampering.

Further, according to a fourth aspect of the present invention, an information processing method comprises:

a data reading step for reading data from an information recording medium; and a data processing step for executing processing of a program included in information read from the information recording medium;

wherein the data processing step includes a step for determining the type of the information recording medium from which the program has been read, and executing of the program under the condition that the program is of a type regarding which execution permission has been set beforehand.

Further, according to an embodiment of the information processing method according to the present invention, in the data processing step, type information of information recording media regarding which program execution is permitted is obtained from information read from the information recording medium, and program execution permitted/not-permitted determination is executed in accordance with the obtained information.

Further, according to a fifth aspect of the present invention, a computer program for executing an information processing method comprises:

a data reading step for reading data from an information recording medium; and a data processing step for executing recording processing of new data either generated or obtained applying information obtained from the information recording medium;

wherein the information recording medium is an information recording medium storing recorded data in increments of content management units including encrypted data encrypted by unit keys each of which are set as different encryption keys;

and wherein the data processing step includes an obtaining step for obtaining a unit key corresponding to a content management unit to which the obtained information belongs or a unit key corresponding to a new content management unit, a step for executing encryption processing of the new data applying the obtained unit key, and a step for executing recording processing with the generated encrypted data as data configuring the content management unit.

Further, according to an embodiment of the computer program according to the present invention, the computer program further comprises an encryption recording processing step for executing of encryption processing of an AV stream data file including new data, and a navigation file including control information or a program to be applied to playing processing of AV stream data including new data, and recording to recording means.

Further, according to an embodiment of the computer program according to the present invention, the computer program further comprises a step for recording, to storage means, tampering verification data regarding at least one of an AV stream data file including new data, and a navigation file including control information or a program to be applied to playing processing of AV stream data including new data, and recording to recording means.

Further, according to an embodiment of the computer program according to the present invention, the computer program further comprises a step for executing data tampering verification processing based on the tampering verification data set for the AV stream data file including new data or the navigation file, at the time of using the file, and executing of usage processing of the files under the condition that there is no tampering.

Further, according to a sixth aspect of the present invention, a computer program for executing an information processing method comprises:

a data reading step for reading of data from an information recording medium; and a data processing step for executing processing of a program included in information read from the information recording medium;

wherein the data processing step includes a step for determining the type of the information recording medium from which the program has been read, and executing of the program under the condition that the program is of a type regarding which execution permission has been set beforehand.

Note that the computer program according to the present invention is a computer program which can be provided to, for example, a computer system capable of executing various types of program code, in a computer-readable format, through storage media or communication media, e.g., recording media such as DVDs, CDs, MOs, or the like, or communication media such as networks. Processing corresponding to the program is realized on the computer system by such a program being provided in a computer-readable format.

Further objects, features, and advantages of the present invention will become more apparent from the following embodiments of the present invention and from detailed description of the attached drawings. Note that system as used in the present specification means a logical group of multiple devices, and is not restricted to each of the devices of the configuration being within the same housing.

Advantages

According to the configuration of the present invention, new data such as information which a user has generated or information which has been downloaded newly in relation to content information in increments of units stored in an information recording medium, in the form of encrypted data to which a unit key corresponding to a content management unit or a unit key corresponding to a new content management unit has been applied, as content management unit configuration data, so secure data management and usage management is realized for newly-generated data in the same way as with the original unit correlated data.

Further, according to the configuration of the present invention, in execution of a program included in information read from an information recording medium, the type of the information recording medium from which the program has been read is determined, and the program is executed under the condition that the type is a type set beforehand with permission for execution of the program, so execution of the program using a copied disk of the content, for example, will be rejected, and unauthorized usage of copied disks can be prevented.

Further, according to the configuration of the present invention, besides AV stream data files, navigation files as well are encrypted or set with tampering verification data and stored, so using a CPS-unit-compatible AV stream data file or navigation file applying applications other than licensed application, or performing processing such as modifying data or the like, on a device capable of using various applications such as a PC or the like, for example, can be prevented, and unauthorized use of CPS-unit-compatible data including navigation files can be eliminated.

Additional features and advantages of the present invention are described in, and will be apparent from, the following Detailed Description and the Figures.

BRIEF DESCRIPTION OF THE FIGURES

FIG. 16 is a flowchart for describing a configuration for identifying as a CPS unit new data generated or obtained with the information processing device.

DETAILED DESCRIPTION

Figure 1:
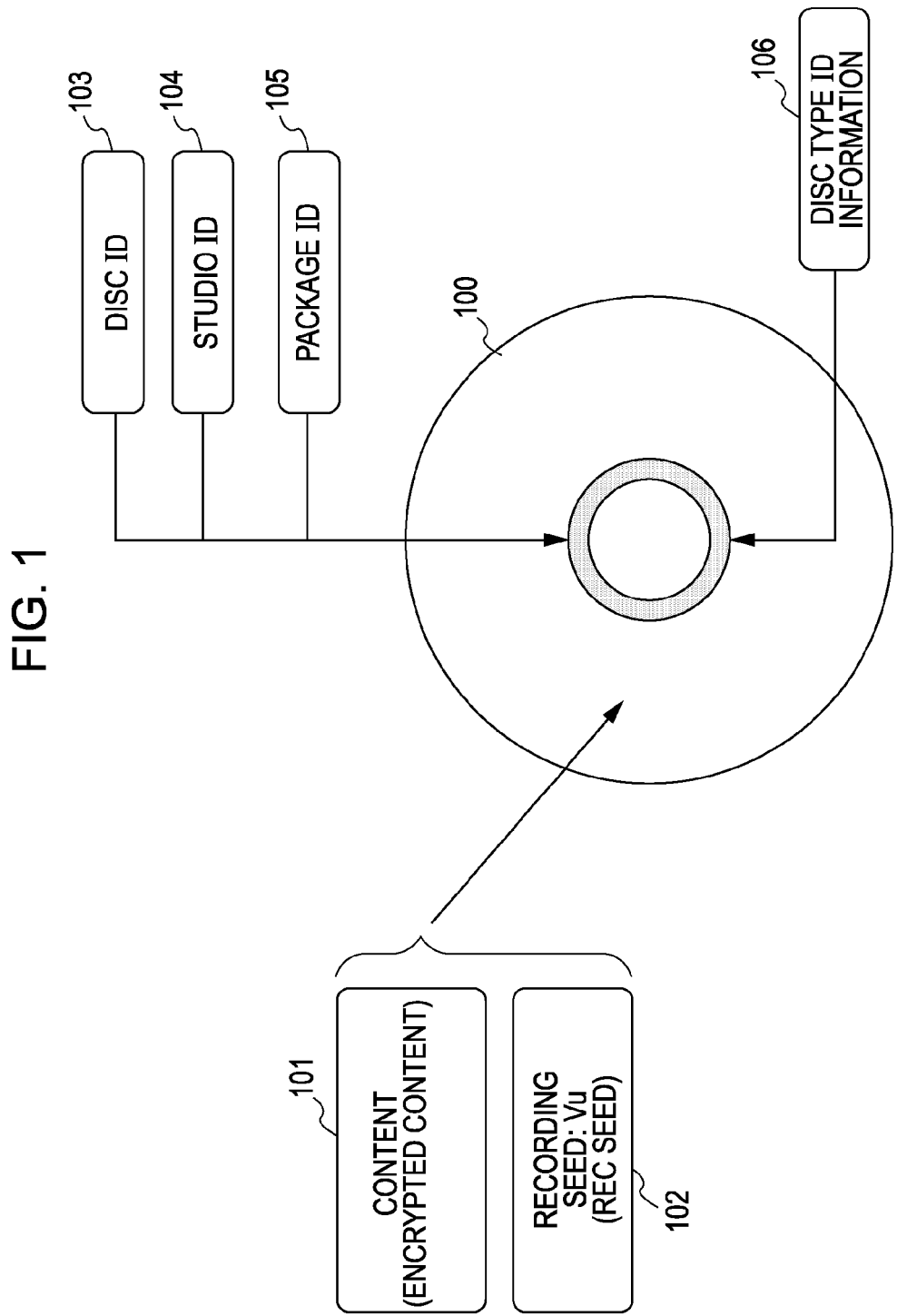
FIG. 1 is a diagram for describing the configuration of data stored in an information recording medium.

The following is a detailed description of the information processing device, information processing method, and computer program, according to the present invention, with reference to the drawings. Note that description will proceed along the following items.

1. Stored data in information recording medium
2. Content storing configuration
3. Encryption and usage management configuration for stored content
4. Management configuration for newly generated data or obtained data
5. Encryption and tamper-proofing configuration of navigation file
6. Storage processing of new data generated or obtained by information processing device
7. Configuration for correlating CPS unit configuring data in an information recording medium and CPS unit configuring data stored outside of an information recording medium
8. Processing configuration restricting program execution conditions
9. Configuration example of information processing device

[1. Stored Data in Information Recording Medium]

First, stored data in an information recording medium will be described. FIG. 1 illustrates an example of an information recording medium in which is stored content to which the processing of the present invention is applicable.

An information recording medium 100 is an information recording medium storing authorized content, manufactured in a disk manufacturing plant under permission of a so-called content right holder who has authorized content authoring rights or distribution rights. Note that with the following embodiment, an example of a disc-shaped medium will be described as an example of the information recording medium, but the present invention can be applied to configurations using various forms of information recording media.

The information recording medium 100 is a recording medium of various forms, such as for example, a ROM disc to which data rewriting is impossible, a partial ROM disc wherein only a part of the data region is rewritable, a disc where data rewriting can be performed for the entire region, and so forth.

AS shown in FIG. 1, content 101 is stored in the information recording medium 100. This is content 101 made up of, for example, AV (Audio Visual) streams of moving picture content such as HD (High-Definition) movie content which is high definition moving image data, game programs in formats stipulated by particular standards, image files, audio data, text data, and so forth. These contents include various forms of information, such as information usable only by data from the information recording medium 100, information usable by combining data from the information recording medium 100 and data provided from a server connected to a network, and so forth.

The content 101 stored in the information recording medium 100 has at least part thereof stored as encrypted content, and a recording seed (REC SEED) 102 is stored as information necessary for generating a key to be applied to decryption processing of the encrypted content. The encrypted contents are stored in the information recording medium 100 as encrypted data to which a unit key has been applied as an individual encryption key for each, for usage management of the contents. The recording seed (REC SEED): Vu 102 is key generation information to be applied for generating individual unit keys. Note that the recording seed (REC SEED) 102 is not restricted to being stored in the information recording medium 100, and may be obtained form a server connected via network, for example.

The information recording medium 100 further stores a disc ID 103 serving as identifier information of the information recording medium 100, a studio ID 104 serving as an identifier of an editing studio of the stored contents of the information recording medium 100, a package ID 105 serving as a package identifier as a manufacturing unit of the information recording medium 100, and disc type identification information 106.

The contents stored in the information recording medium 100 are contents made up of, for example, AV (Audio Visual) streams of moving picture content such as HD (High-Definition) movie content which is high definition moving image data, game programs in formats stipulated by particular standards, image files, audio data, text data, and so forth. In the event that the information recording medium is a Blu-ray disc which is a data recording disc using blue laser which is capable of high-density recording, for example, data following the Blu-ray disc ROM standard format is stored as main contents.

Further, there may be cases wherein data having data formats not following a particular AV data format, such as game programs serving as service data, image files, audio data, text data, and like contents, are stored as sub-contents.

The various contents 101 stored in the information recording medium 100 are each stored in the information recording medium 100 being individually encrypted applying individual unit keys, for usage management of contents. The recording seed 102 is applied as key generating information for generating unit keys.

That is to say, AV (Audio Visual) streams, music data, moving pictures, still images and like image data, game programs, WEB contents, and the like, making up the contents, are selection into units which are management units of content usage, with a different recording seed: Vu 102 being applied to each section unit, so that a unit key can be generated based on the recording seed corresponding to each unit, and reproduction is enabled by decryption processing of the encrypted contents applying the unit key.

For example, at the time of using contents of an AV (Audio Visual) stream stored in the information recording medium 100, a predetermined encryption key generating sequence is executing applying the recording seed: Vu 102 and, though not shown in the drawings, other secret information such as a physical index recorded in the information recording medium 100 or the like, to obtain a unit key corresponding to the unit, and decryption processing of the encrypted content contained in the unit is performed based on the obtained unit key, and reproduction is performed.

Figure 2:
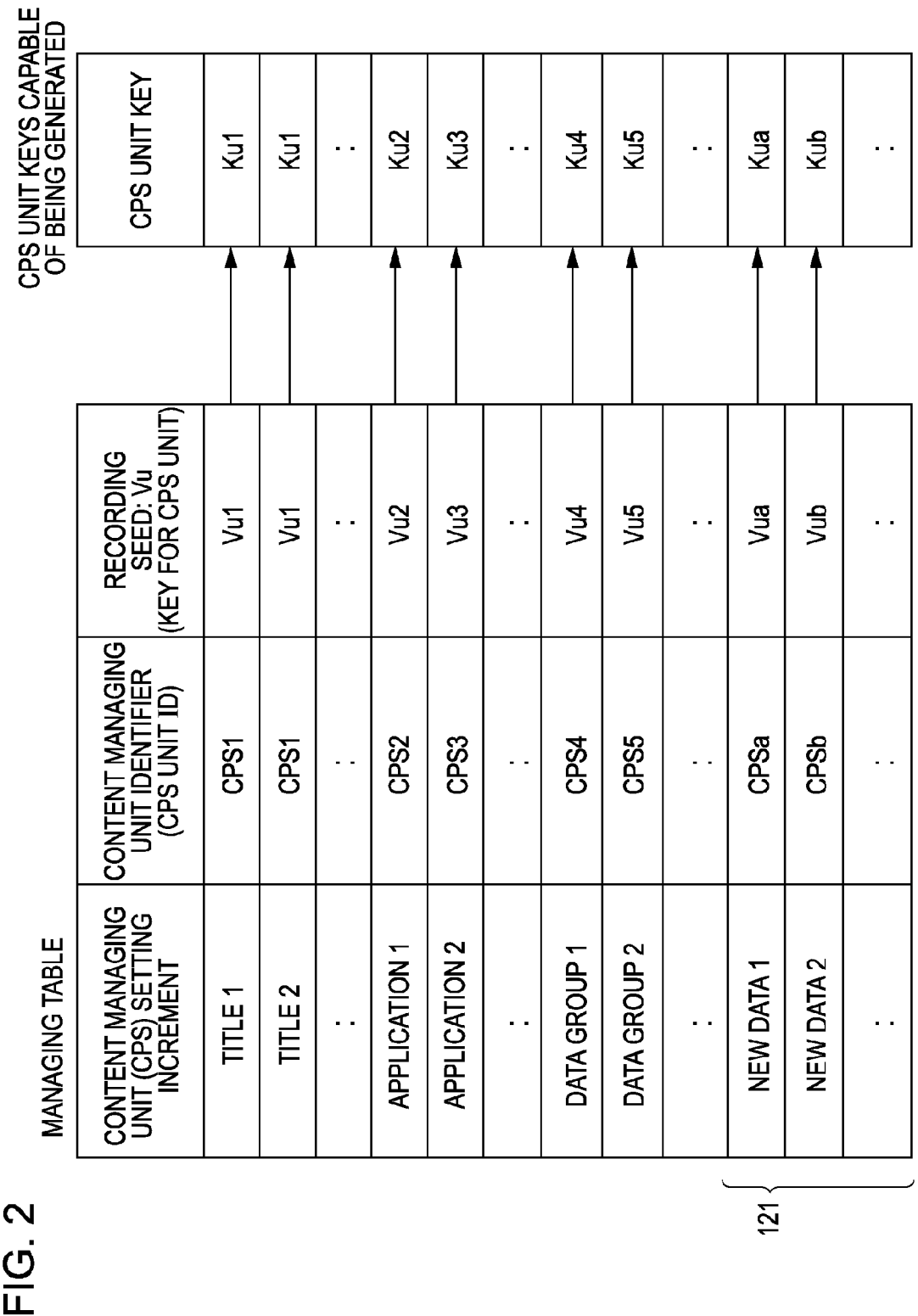
FIG. 2 is a diagram illustrating an example of a CPS unit management table.

As described above, the encrypted contents stored in the information recording medium 100 are sectioned into units which are content usage management units. These units are called CPS units (content management units). FIG. 2 shows a correlation example of CPS unit confirmations and recording seeds. FIG. 2 illustrates the correlation between a CPS unit managing table serving as content management information stored in the information recording medium, and CPS unit keys which can be generated based on the recording seeds corresponding to each unit.

As illustrated in the CPS unit management table shown in FIG. 2, there are various setting increments of a CPS unit, such as content title, application, data group, and so forth, with a CPS unit ID serving as an identifier corresponding to each CPS unit, recording seed information, and so forth, being correlated to each CPS unit management table.

In FIG. 2, Title 1 is CPS unit 1 and Vu1 is set as a corresponding recording seed, Title 2 is CPS unit 1 and Vu1 is set as a corresponding recording seed, and Application 1 is set as CPS unit 2.

For example, a unit key Ku1 is generated based on the recording seed Vu1 and decryption processing of the encrypted contents contained in the CPS unit (CPS1) which can be distinguished by Title 1 and Title 2, by encryption processing applying the unit key Ku1. In the same way, a unit key Ku2 is generated based on the recording seed Vu2 and decryption processing of the encrypted contents contained in the CPS unit (CPS2) which can be distinguished by Application 1, by encryption processing applying the unit key Ku2. The same holds true for the rest.

Note that CPS units are set in the CPS unit management table for new data other than contents stored in the information recording medium, such as data which the user has newly generated, or data obtained externally. These are CPS units which the user can newly define with regard to the new data. The CPS units corresponding to the data fields 121 shown in FIG. 2 are applicable as units for new data.

These CPS units are units which can be set as management units for new data which the user has generated or obtained, such as, for example, data obtained by executing contents stored in the information recording medium, such as a program for example, specifically, newly generated data such as partway information or score information of games, auxiliary data corresponding to AV streams which are contents stored in the information recording medium such as screen data obtained form an external server for example, and so forth. Usage forms of these will be described in detail later.

[2. Content Storing Configuration]

The storage format of contents stored in the information recording medium according to the present invention will be described with reference to FIG. 3.

Figure 3:
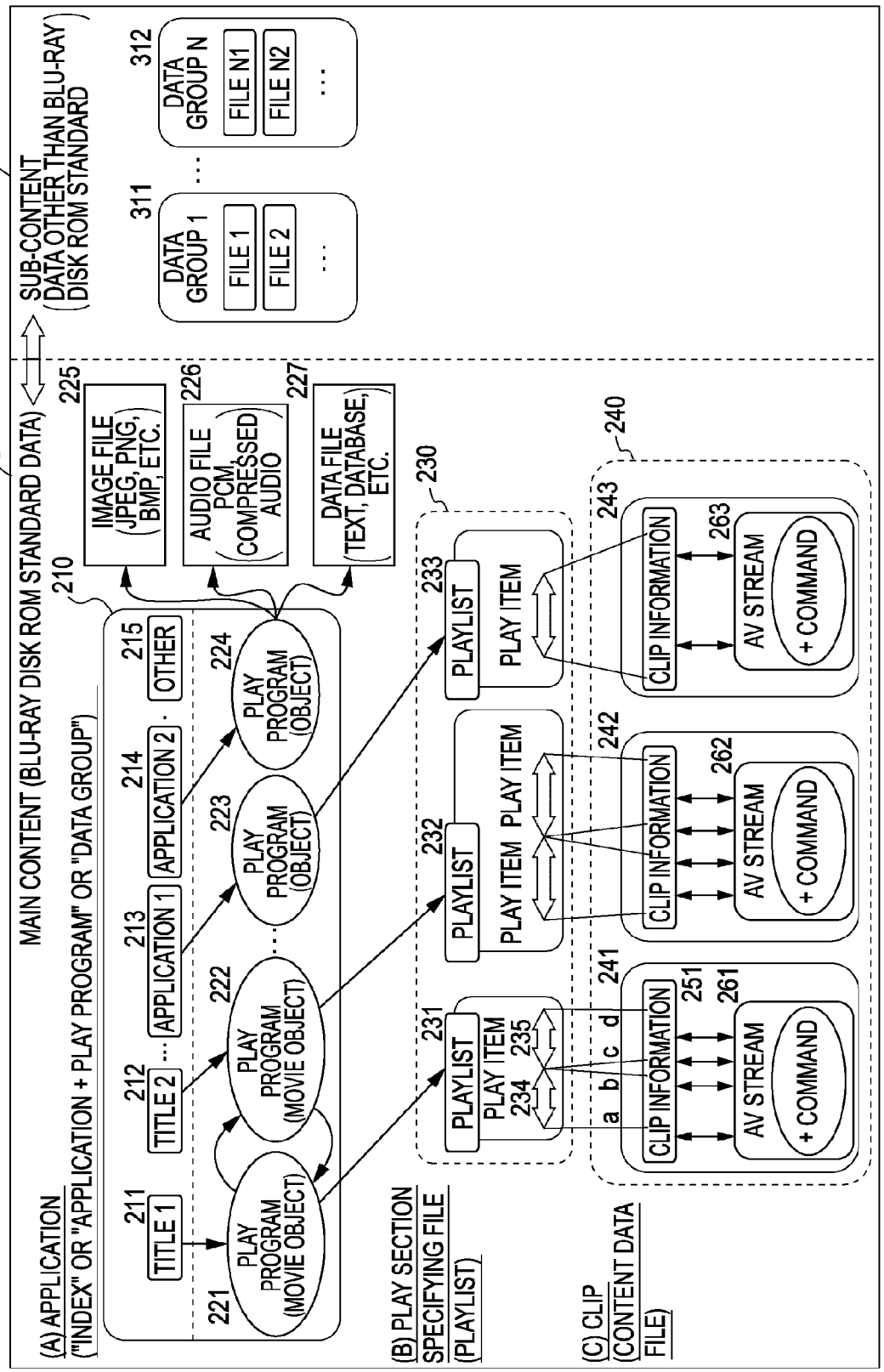
FIG. 3 is a diagram for describing a setting example of content management units set with regard to content stored in an information recording medium.

As shown in FIG. 3, the information recording medium stores an AV stream of moving picture contents, such as HD (High Definition) movie contents which is high-definition moving picture data, for example, as the main content 200, and other data and programs, such as game programs which are service data, image files, audio data, text data, and so forth, for example, are stored as sub-contents 300.

The main content 200 is stored following a particular AV format, for example, the Blu-ray disc ROM standard format, as Blu-ray disc ROM standard data, and the sub-contents 300 are stored in an arbitrary format not following the Blu-ray disc ROM standard format, as data other than Blu-ray disc ROM standard data.

As shown in FIG. 3, the main content 200 stored following the Blu-ray disc ROM standard format has the moving picture content (AV stream) as actual content to be reproduced, and has a hierarchical configuration following the Blu-ray disc ROM standard format, which is (A) Application 210
(B) Play section specifying file (playlist) 230
(C) Clip (content data file) 240.
(C) Clip (content data file) 240 has clips 241, 242, and 243, which are each sectioned content data files, with each clip 241 having an AV (Audio-Visual) stream file 261 and clip information file 251.

The clip information file 251 is a data file storing attribute information belonging to the AV (Audio-Visual) stream file 261. An example of the AV (Audio-Visual) stream file 261 is MPEG-TS (Moving Pictures Experts Group-transport Stream) data, having a data structure wherein various types of information, such as images (Video), audio (Audio), caption data, and the like, have been multiplexed. There are also cases wherein command information for performing control of a player device at the time of reproduction is multiplexed as well.

(B) Play section specifying file (playlist) 230 has multiple play section specifying files (playlists) 231, 232, and 233. Each of the play section specifying files (playlists) 231, 232, and 233 is of a configuration having one or more play items wherein one of multiple AV stream data files included in the clip (content data file) 240 has been selected, and the play start point and play end point of a particular data portion of the selected AV stream data file has been selected, so that by selecting one play section specifying file (playlist), a platy sequence is determined a playback is executed following a play item of the play section specifying file (playlist).

For example, in the case of selecting the play section specifying file (playlist) 231 and playing the content, the play item 234 correlated with the play section specifying file (playlist) 231 has a play start point a and a play end point b in the clip 241, and also the play item 235 has a play start point c and a play end point d in the clip 241, so selecting the play section specifying file (playlist) 231 to play contents plays the particular data regions a through b and c through d of the AV stream file 261 which is the content contained in the clip 241.

The (A) application 210 is set as a layer having a combination of application index files 211 and 212 including content tiles presented on the display where content playing is to be executed and reproduction programs 221 and 222, or a combination of application execution files 213 and 214 such as game contents, WEB contents, and the like, and reproduction programs 223 and 224. The user can determine the object of reproduction by selecting the titles included in the application index files 211 and 212.

Each title is correlated with one play program (e.g., movie object) of the play programs 221 through 224, and upon the user selecting one title, reproduction processing based on the play program corresponded to the selected title is started. The application index files 211 and 212 indicated as Title 1 and Title 2 in the drawing include title presenting programs which display titles and menus which are automatically reproduced at the time of setting and starting up the information recording medium.

The application index fields 211 and 2121, and the application execution fields 213 and 214 may include application resource files used for executing application, in some instances. There are also cases, wherein various data files which can be obtained from information recording media or network connection servers, for example image files 225 such as JPEG, PNG, BMP, and so forth, audio files 226 such as PCM compressed audio and the like, various types of data files 227 such as text and databases, are applied as application resource files.

The play programs (e.g., movie objects) 221 through 224 are content play processing programs for programmably providing functions necessary for presenting play contents (HD movie contents), such as, in addition to the play section specifying file (playlist) to be reproduced, responses as to operation information relating the content playing processing input from the user, jumping between titles, branching of playback sequences, and so forth. The play programs 221 through 224 permit jumping one to another, with a reproduction program to be actually executed following user inputs or a preset program, and playback contents are selected from the clips 240 by the play section specifying file (playlist) 230 specifying the selected reproduction program, and played.

The main content 200 is managed in a hierarchical configuration following the Blu-ray disc ROM standard format, as Blu-ray disc ROM standard data for example, as shown in the drawings, with content management units (CPS units) being set with regard to this hierarchical configuration framework, and usage management of the contents is performed in increments of the content management units (CPS units). Details of the content management units (CPS units) will be described later.

Sub-contents 300 are also stored in the information recording medium along with the main content 200. The sub-contents 300 are contents stored in a certain AV format, e.g., in an arbitrary format not following the Blu-ray disc ROM standard format.

The sub-contents 300 are, for example, game programs serving as service data, image files audio files, text data, ad so forth, and a group of multiple data files is set as a data group.

FIG. 3 illustrates data group 1, 311, through data group N, 312. These data groups can also be set as usage management object contents, and in the event of being set as usage management object contents, content management units (CPS units) are set in increments of the data groups, so that usage management is performed in increments of data groups.

[3. Encryption and Usage Management Configuration for Stored Content]

Next, a content management configuration for sectioning the contents stored in the information recording medium into content management units (CPS units) and realizing usage control differing for each unit, will be described with reference to FIG. 4 and the following drawings.

As described earlier with reference to FIG. 2, a unit key is assigned to each content management unit (CPS unit) as a different encryption key. The increment to which one unit key is assigned is a content management unit (CPS unit). Note that a unit key is a key which can be generated based on a recording seed corresponding to the unit.

Each of the unit keys are applied to encrypt contents belonging to each unit, and at the time of using the contents, a unit key assigned to each unit is obtained for reproduction. Each unit key can be individually managed, such that for example, a unit key assigned to a certain unit A is set as a key which can be obtained from an information recording medium. Also, a unit key to be assigned to a unit B is a key which can be obtained under the condition that a server connected by network has been access and the user has executed predetermined procedures, and so on; in this way, the obtaining and managing configurations of cores corresponding to the units can have forms independent for each unit key.

The setting form of an increment for assigning one key, i.e., a content management unit (CPS unit), will be described with reference to FIG. 4.

First, Description will be made regarding the setting configuration of a content management unit (CPS unit) at the main content 200 side.

At the main content 200 side, CPS units are set including application index files 211 or 212 including one or more titles, or application execution files 213 or 214, included in the (A) application 210, or the like.

Figure 4:
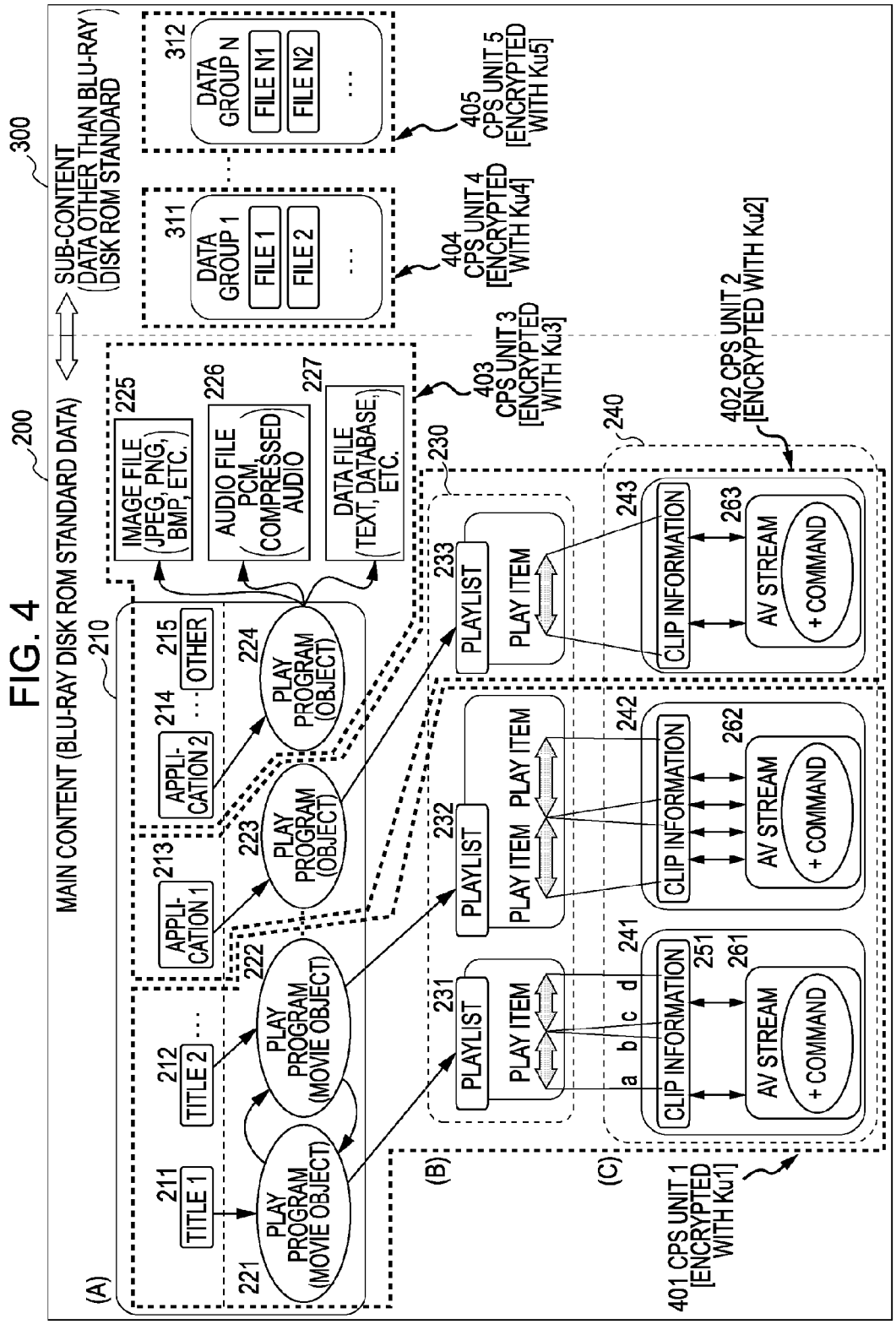
FIG. 4 is a diagram for describing an encryption configuration example of content management units set with regard to content stored in an information recording medium.

The CPS unit 1, 401 shown in FIG. 4 is a unit regarding which application execution files, play program files, playlists, and an AV stream file group serving as actual data of the contents, have been set as a single unit.

Also, the CPS unit 2, 402 is a unit regarding which an application execution file, play program file, playlist, and an AV stream file group serving as actual data of the contents, have been set as a single unit.

Also, the CPS unit 3, 403 is a unit regarding which application index files, a play program file, and various data files which can be obtained from an information recording medium or from a network connection server, have been set as a single unit.

These units are individually encrypted with the same keys (CPS unit keys: Keys Ku1, Ku2, and Ku3 in FIG. 4) and stored in the information recording medium.

In FIG. 4, the content management unit (CPS unit) 1, 401 and the content management unit (CPS unit) 2, 402 are units configured of higher layer (A) applications and lower layer (B) play section specifying files (playlists)+(C) clips (content data files), and the content management unit (CPS unit) 3, 403 is a unit configured of higher layer (A) applications and various data files which can be obtained from an information recording medium or from a network connection server, i.e., image file 225, audio file 226, data file 227, and so forth, without including the lower layer (B) play section specifying files (playlists)+(C) clips (content data files).

The content management unit (CPS unit) 1, 401 includes the Title 1, 211 and title 2, 212, play programs 221 and 222, play lists 231 and 232, and clip 241 and clip 242, and the AV stream data files 261 and 262 which are the actual data of the contents contained in the two clips 241 and 242 are encrypted applying the unit key: Ku1 which is an encryption key correlated with the content management unit (CPS unit) 1, 401.

The content management unit (CPS unit) 2, 402 includes the application file 213 configured of game contents, WEB contents, or the like, play program 223, play list 233, and clip 243, and the AV stream data file 263 which is the actual data of the contents contained in the clip 243 is encrypted applying the unit key: Ku2 which is an encryption key correlated with the content management unit (CPS unit) 2, 402. further, the application 213 may also be made an encrypted file to which the unit key: Ku2 has been applied.

The content management unit (CPS unit) 3, 403 is set as a unit including the application files 214 and 215 included in the upper layer (A) application layer, play program 224, and further various data files, for example image files 225 such as JPEG, PNG, BMP, and so forth, audio files 226 such as compressed audio and the like, various types of data files 227 such as text and databases, which can be obtained from an information recording medium or from a network connection server by the play program 224.

The content management unit (CPS unit) 3, 403 is encrypted applying the unit key: Ku3 which is an encryption key correlated with the content management unit (CPS unit) 3, 403.

For example, in order for the user to execute an application file or content playing processing correlated to the content management unit 1, 401, there is the need to obtain the unit key: Ku1 by encryption processing applying the recording seed Vu1 set in a manner correlated with the content management unit (CPS unit) 1, 401, and execute the contents decryption processing sequence applying the obtained unit key Ku1, and following executing the encryption processing, the application program can be executed to play the contents.

For example, in order to perform usage processing of application files correlated to the content management unit 3, 403, or image files 225, audio files 226 such as PCM or compressed audio, and various data files 227 such as text and databases and the like, correlated to the reproduction program 224, there is the need to obtain the unit key: Ku3 serving as an encryption key correlated with the content management unit (CPS unit) 3, 403, and execute the contents decryption processing sequence applying the obtained unit key Ku3, and following executing the encryption processing, the application program can be executed or the various files can be executed.

A directory configuration example a directory for storing the contents and management information such as key information of the contents corresponding to the above-described various types of content management units (CPS units) will be described with reference to FIG. 5.

Figure 5:
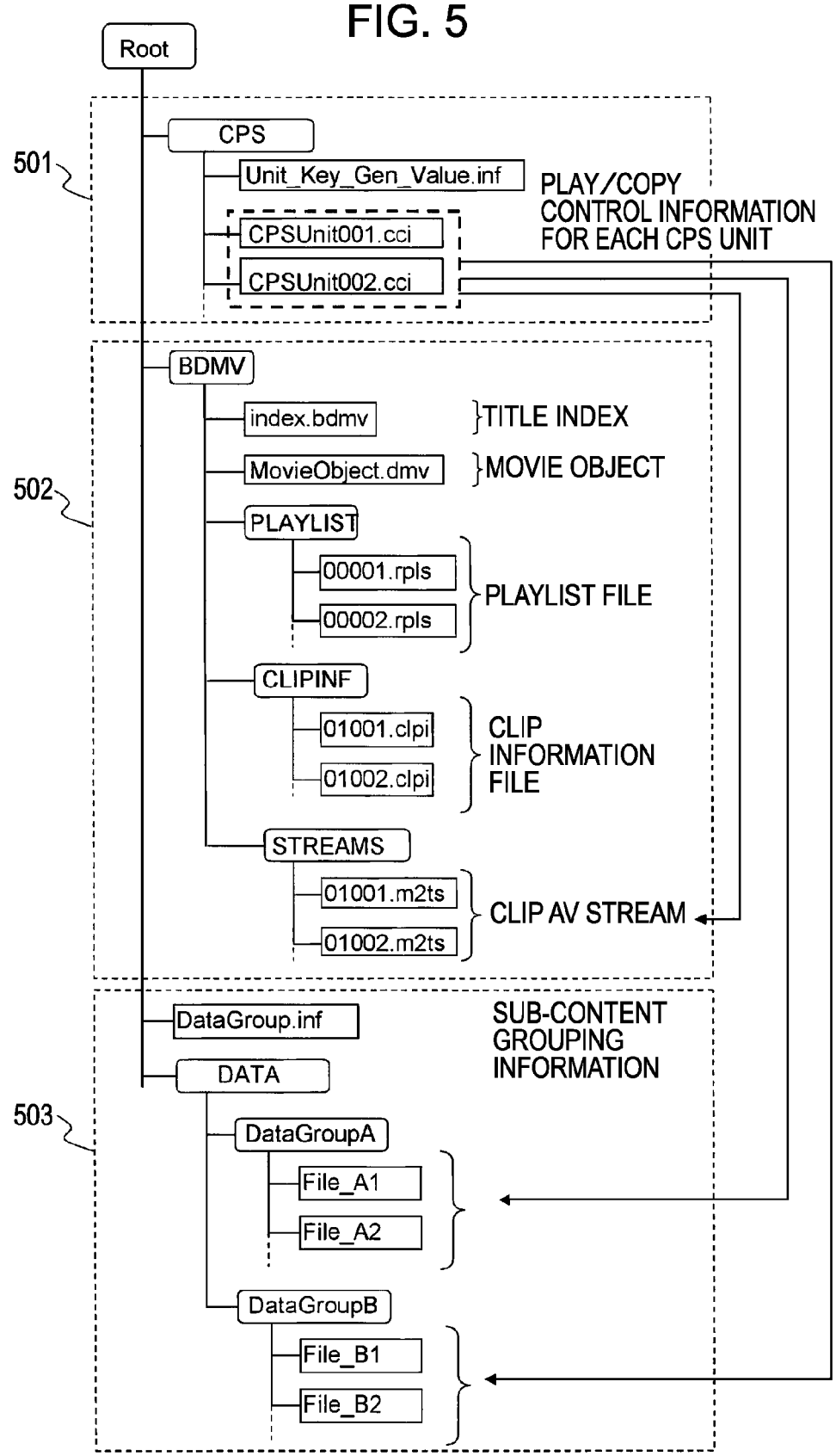
FIG. 5 is a diagram for describing a configuration example of a data storage directory in an information recording medium.

The directory configuration shown in FIG. 5 is a configuration wherein there is set a main content data portion 502, sub-content data portion 503, and a content management data portion 501 corresponding to the main content and sub-contents. The BDMV directory shown in the main content data portion 502 is set a director for holding contents and applications according to the Blu-ray Disc ROM format.

The main content following the Blu-ray Disc ROM format has a hierarchical configuration of titles, objects, playlists, clip information, AV streams, and so forth as described earlier with reference to FIG. 3 and FIG. 4, and data files making these up are set in the BDMV director.

The Data directory in the sub-contents data portion 503 is set as a directory for holding contents and applications for each group with a format not following the Blu-ray Disc ROM format. The DataGroup.inf in the sub-contents data portion 503 is a file storing the group information of the sub-contents.

The management data portion 501 stores management files correlated to both contents of the main contents and the sub-contents. For example, the CPS unit management table set correlating the CPS unit IDs for each content management unit (CPS unit) and recording see information shown in FIG. 2 as described above, and further, play control information of contents set corresponding to each unit, and copy control information, are stored.

Content play control information and copy control information are set as individual information for each CPS unit. For example, individual content usage control information is set for each CPS unit stored in the information recording medium such as

[CPS Unit 1]
Number of copies permitted to recording medium: a times, number of playbacks permitted: b times, remote playback permitted/not-permitted: permitted . . .

[CPS Unit 2]
Number of copies permitted to recording medium: 0 times, number of playbacks permitted: c times, remote playback permitted/not-permitted: not permitted . . . and so on.

[4. Management Configuration for Newly Generated Data or Obtained Data]

As described above, contents stored in the information recording medium are sectioned into CPS units, and CPS unit keys serving as encryption keys corresponding to each CPS unit can be used by obtaining applying recording seeds.

Management processing will be described regarding data other than the content already stored in the information recording medium, such as data generated following a program stored in the information recording medium, specifically, partway information or character data generated by executing a game program, or data obtained from a server or the like via a network; of such data newly generated or obtained by some sort of user processing.

Figure 6:
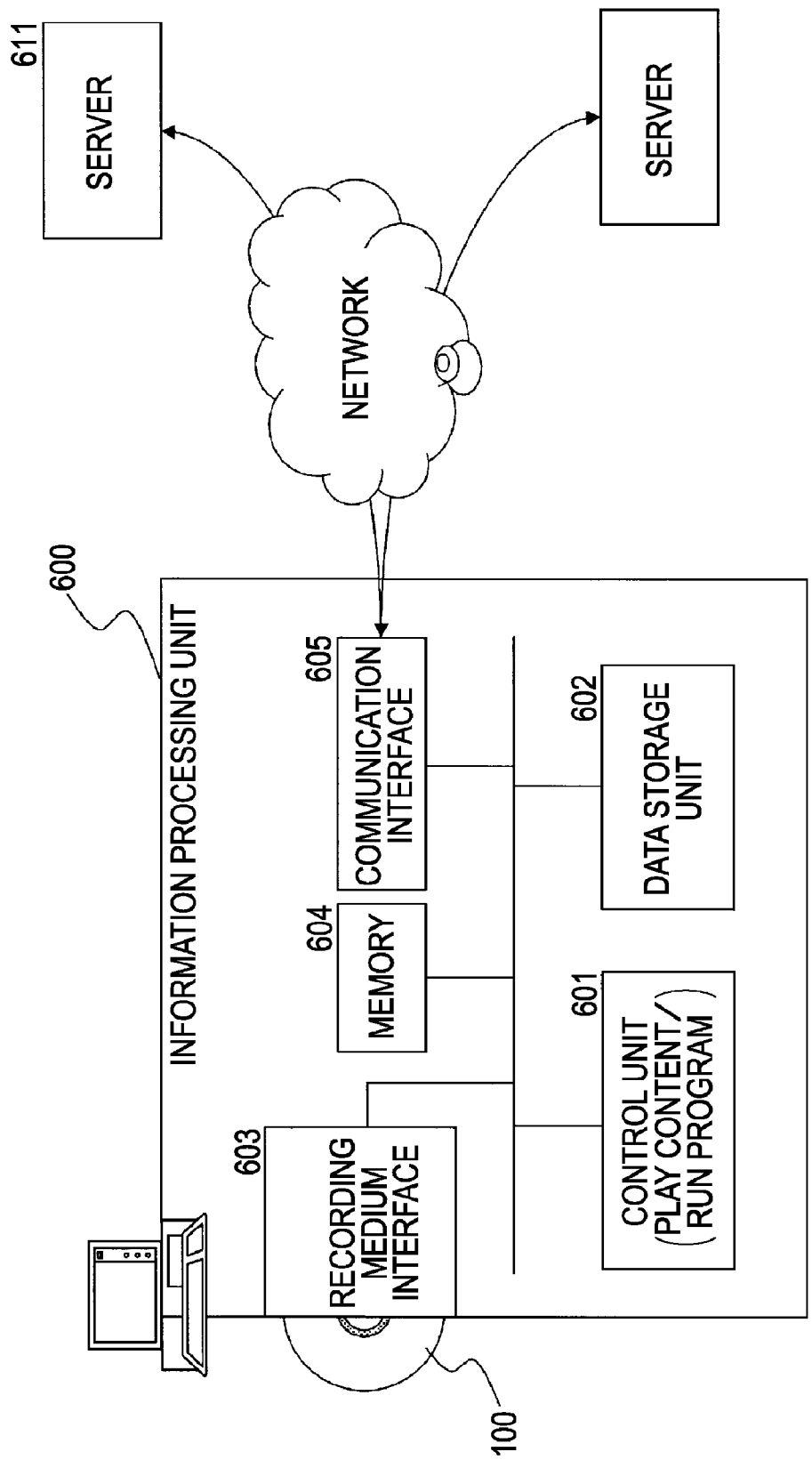
FIG. 6 is a diagram for describing processing for generating or obtaining new data in an information processing device to which an information recording medium has been mounted.

FIG. 6 illustrates an example of generating and obtaining processing of data relating to contents already stored in the information recording medium.

FIG. 6 illustrates an information processing device 600 such as a PC or the like, for example, for executing the reproduction processing of the information recording medium. The information processing device 600 has a control unit 601 having a program execution function such as a CPU for example of executing content reproduction processing, a data storage unit 602 configured of a hard disk or the like, a recording media interface 603 for performing data input/output to information recording media, memory 604 configured of ROM and RAM used as program execution regions, parameter storage regions, and the like, and a communication interface 605 for executing communication via a network. Note that the configuration of the information processing device 600 shown in FIG. 6 is a minimal configuration for describing the new data generating and obtaining processing, and that a specific hardware configuration example of an information processing device will be described later.

The information processing device 600 reads contents sectioned into CPS units stored in the information recording medium 100 via the recording medium interface 603 from the information recording medium 100, and performs content reproduction processing under the control of the control unit 601.

The information recording medium 100 has contents store therein which have been recorded based on the Blu-ray Disc ROM standard, as described with reference to FIG. 3 and FIG. 4, for example. Each of the contents are section into CPS units and subjected to encryption processing.

The information processing device 600 generates CPS unit keys based on the recording seeds corresponding to the CPS units, and reproduces the contents. The contents include, for example, games, various types of programs such as AV steam play programs, AV stream data, and so forth.

There are the following two forms wherein the information processing device 600 generates or obtains new data based on reading from the information recording medium 100.

The first is a case of reading information which is analyzable by the information processing device 600 from the information recording medium 100, and obtaining or generating new data based on the read information. An example is a case wherein URL information corresponding to an obtaining target of new data is described in the information recording medium 100, with the information recording medium 100 obtaining this URL information, accessing a server 611 specified by the URL via a communication IF 605 and network using a browser, and downloading the data such as new contents or the like corresponding to the URL. In addition to downloading contents, there are cases wherein new data is generated within the information processing device 600 based on read information from the information recording medium 100.

The second is a case with an application program recorded in the information recording medium 100. For example, there are cases wherein a program read from the information recording medium 100 is executed at the information processing device 600, a certain server 611 is accessed via the communication IF 605 and network following the program to download the contents, or new data is generated in the information processing device 600 by executing the program.

Data generated or obtained by such processing is not data belonging to the CPS units, which are management sections of contents recorded in the information recording medium 100, but with the configuration of the present invention, such new data is managed as data belonging to certain CPS units.

Specifically, new data generated or obtained based on contents corresponding to CPS units stored in the information recording medium 100, is managed as data belonging to the same CPS unit. Or, a new CPS unit is newly defined and the new data is managed by the new CPS unit.

Figure 7:
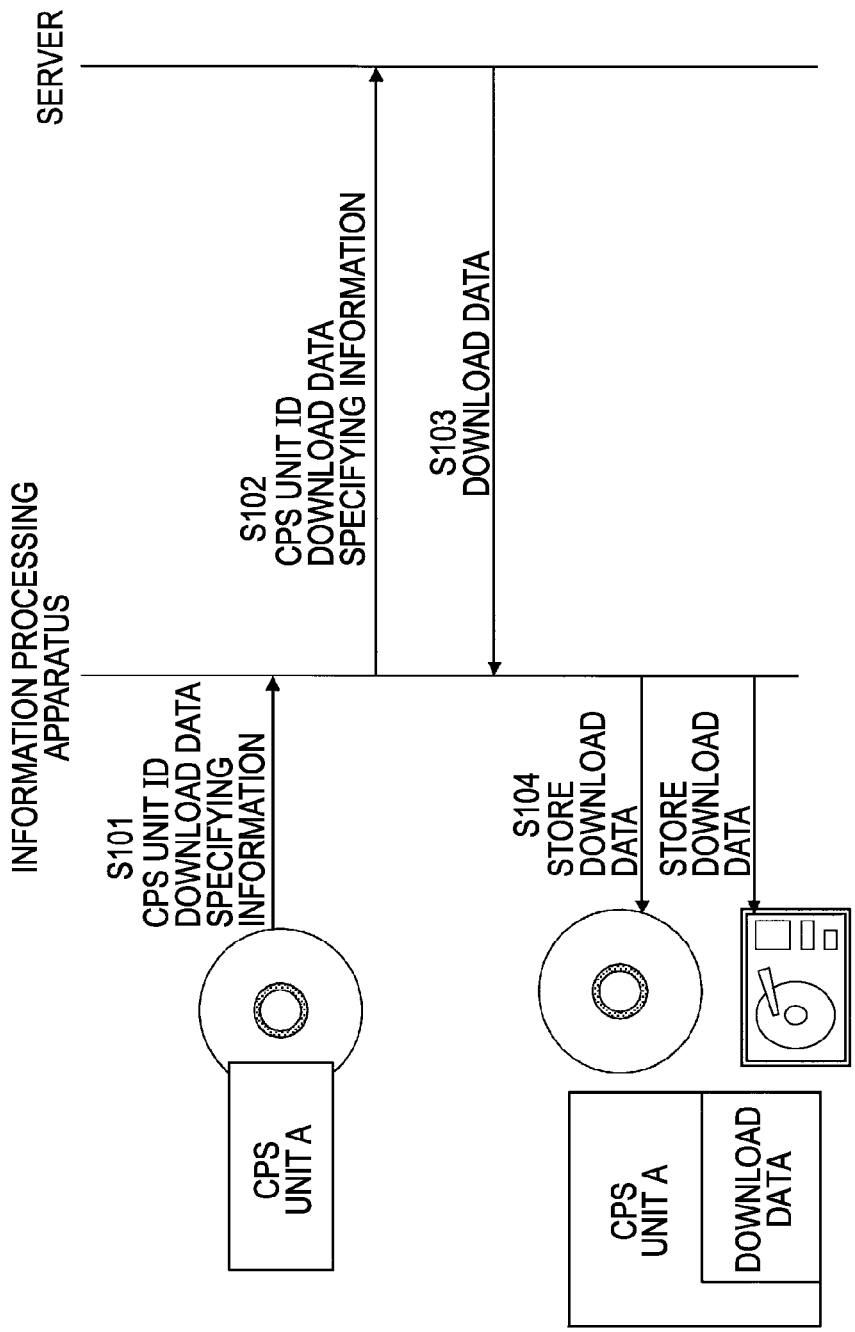
FIG. 7 is a diagram for describing a new data obtaining processing sequence with the information processing device.

FIG. 7 illustrates a processing sequence for obtaining new data from an external server, based on the stored contents in the information recording medium. In step S101, the information processing device reads out from the information recording medium the contents managed by CPS units. For example, let us say that contents belonging to a CPS unit A have been read out.

The information processing device reads out download data specification information, a URL or the like for example, from the information recording medium, obtains the CPS unit ID serving as an identifier of the CPS unit corresponding to the read contents, and in step S102 sends the data, i.e., the CPS unit ID and the download data specification information, to the server.

the server, executes authentication processing regarding whether or not the CPS unit ID has been obtained from an authorized information recording medium, by performing a predetermined authentication sequence, verifies the authenticity of the data request, and in the event that the authenticity has been configured, in step S103 the requested download data is transmitted to the information processing device. For example, the download data may be voice-over audio data of an AV stream, caption data, a player program for particular contents, or the like.

In step S104, the information processing device stores the download data obtained from the server in an information recording medium, and a storage unit such as a hard disk or the like within the information processing device. In either case, the data is stored an managed as data belonging to the same CPS unit A identified by the CPS unit ID, and is encrypted and stored using the encryption processing applying the CPS unit key Ku(a) generated applying the recording seed Vu(a) set as to the CPS unit A.

With the sequence described with reference to FIG. 7, at the time of the information processing device requesting download data from the server, the information processing device transmits the CPS unit ID and download data specifying information, there reason thereof being due to the following management being enabled due to transmitting the CPS unit ID.

(1) The server can manage downloaded data for each CPS unit.
(2) In the event that permission/non-permission of downloading, billing processing, etc., are managed for each CPS unit, a CPS which has been cleared for downloading once can have downloading started from the next time on simply by transmitting the CPS unit ID.
(3) In the event of encryption of downloaded data using a key (unit key) defined for each CPS unit on the information recording medium, the server needs the CPS unit ID to perform encryption processing. Secure data transmission can be realized by the server holding the CPS unit key corresponding to the unit ID, and transmitting data encrypted applying the held CPS unit key.

Note that in addition to information such as URLs and the like download data specification information may include, for example, the studio ID, package ID, title ID, movie object ID, playlist ID, play section information (time stamps of start point and end point), and so forth, determined in Blu-ray Disc ROM standards and the like, and further, values not determined in Blu-ray Disc ROM standards and the like may also be used as download data specification information. Various types of data can be used as download data specification information, as long as the server side can identify the download data, such as user ID, user-related information such as billing status, date-and-time information, management data generated a the information processing device side when reproducing contents, such as number of times played, range played, game scores, play path information for multi-stories, and so forth.

Next, a specific example of data generated or obtained by the information processing device will be described with reference to FIG. 8 and FIG. 9.

Figure 8:
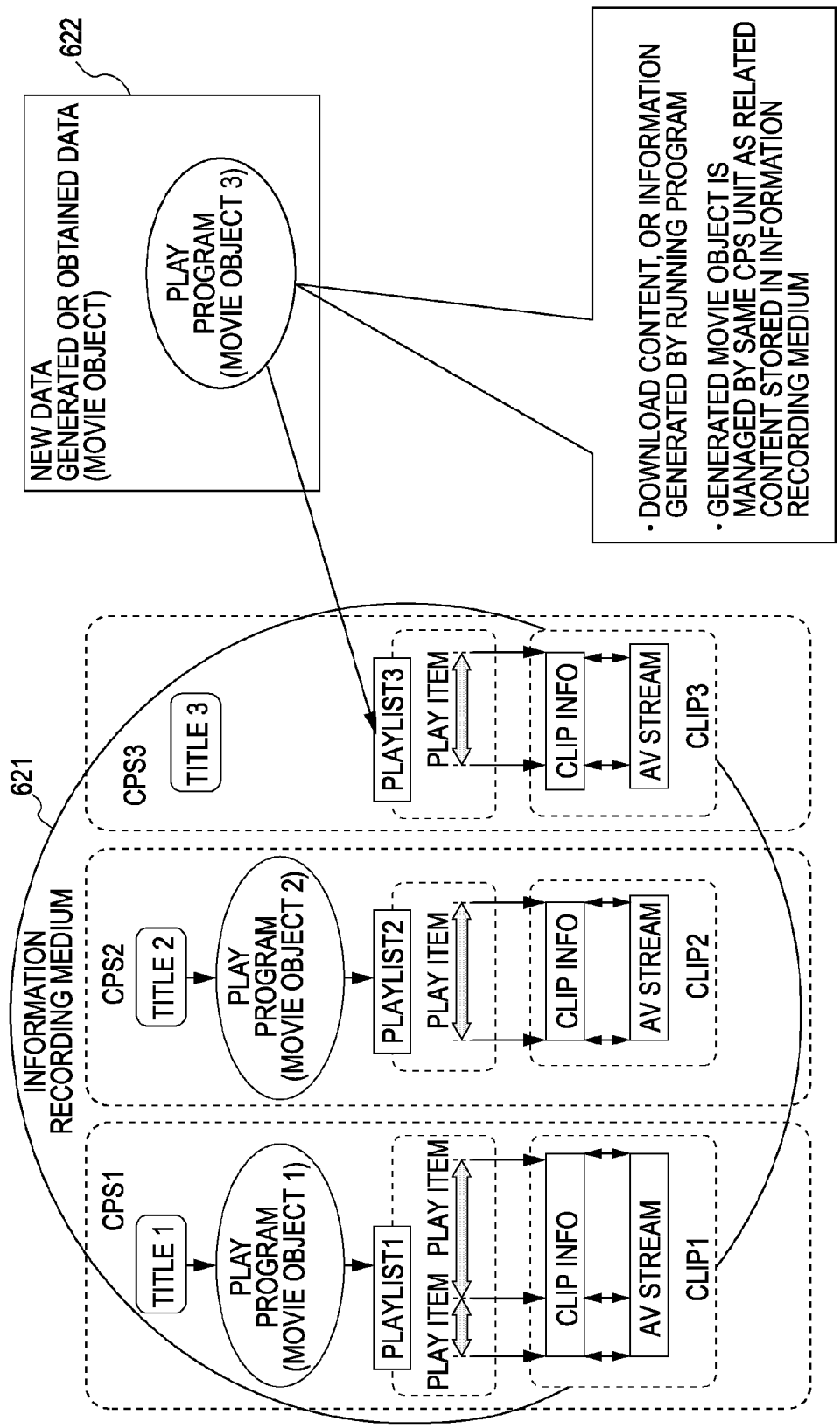
FIG. 8 is a diagram for describing an example of new data generated or obtained with the information processing device.

FIG. 8 illustrates an example of generating or obtaining a part of data following the Blu-ray Disc ROM standard format as new data. As described earlier with reference to FIG. 3 and FIG. 4, contents stored in the information recording medium following the Blu-ray Disc ROM standard format have a hierarchical configuration, and contents reproduction processing, of an AV stream for example, is enable with the data and programs in each hierarchical layer being correlated.

The information recording medium 621 shown in FIG. 8 has CPS units 1, 2, and 3, correlated with three titles, [Title 1], [Title 2], and [Title 3], as contents following the Blu-ray Disc ROM standard format.

Of the three CPS units, the CPS unit 1 and CPS unit 2 which are correlated with the two titles [Title 1] and [Title 2] stores movie objects 1 and 2 as play programs corresponding to the tiles, and the user can set the information recording medium in the information processing device and specify either [Title 1] or [Title 2], thereby executing one of the other of the movie objects 1 and 2 which are play programs, thereby playing the clip files of the sections specified by the playlists, i.e., the AB stream data. However, there is the need to extract the recording seeds corresponding to the respective CPS units form the management data to generate CPS unit keys and decrypt the encrypted data such as the AV streams and the like.

However, the CPS unit 3 does not store a movie object 3 serving as a play program corresponding to the title 3, and accordingly cannot play the clip file contained in the CPS unit, i.e., the AV stream data. In this case, the information processing device generates or obtains a movie object 3 as new data 622 by executing generating or obtaining processing of the movie object 3 as a play program corresponding to the Title 3. The generated or obtained movie object 3 is manages as configuration data of the CPS unit 3.

Figure 9:
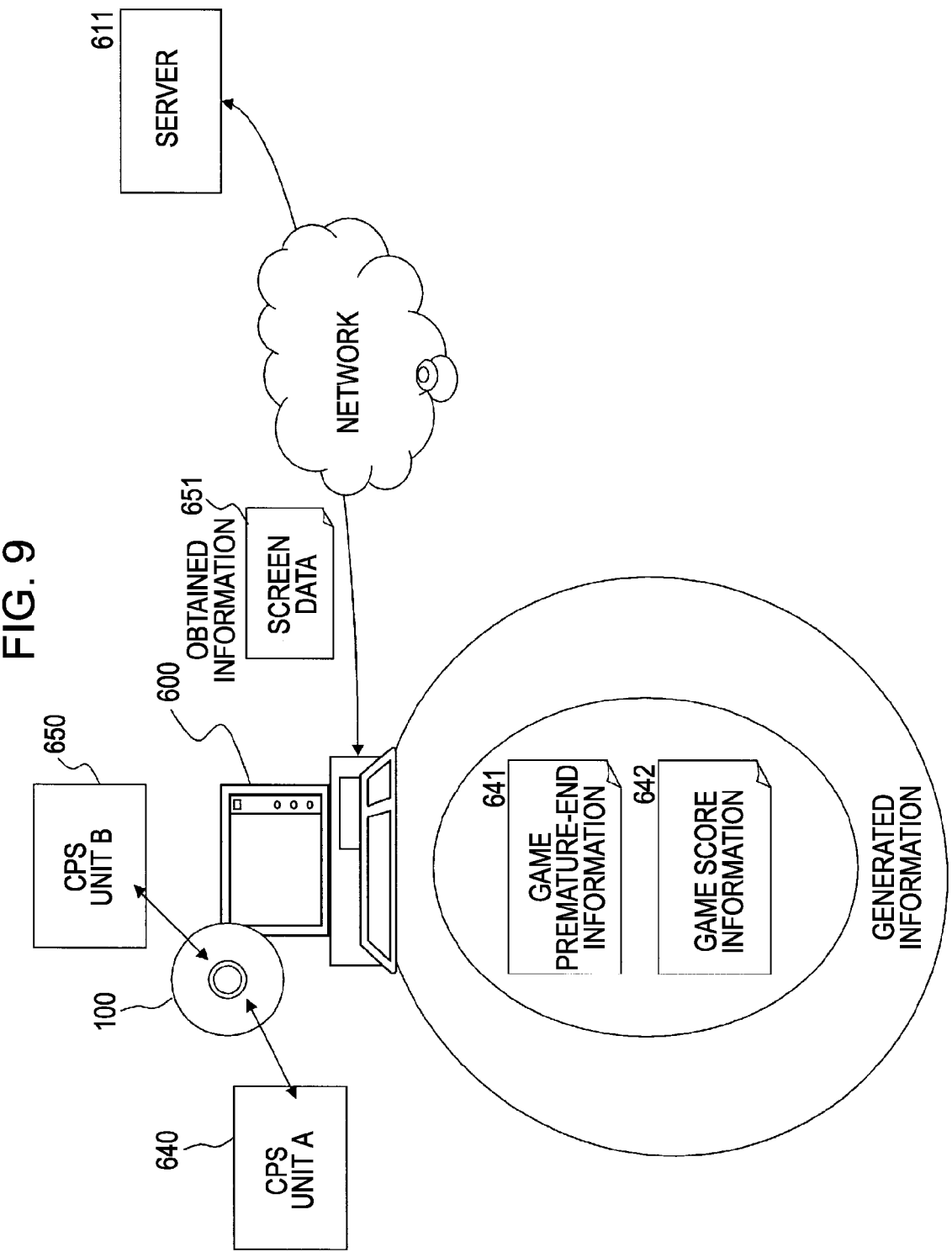
FIG. 9 is a diagram for describing an example of new data generated or obtained with the information processing device.

FIG. 9 is a diagram illustrating another specific example of data which the information processing device newly generates or obtains.

The information processing device 600 reproduces an information recording medium 100 storing contents managed by multiple CPS units.

For example, a CPU unit A 640 is a content management unit including a game program, and upon the information processing device 600 executing the game program, new data 641 and 642 such as partway end information of the game, game score information, and the like, is generated. Such data is subjected to processing for setting as configuration data of the CPS unit A 640 at the information processing device 600, and is stored in the information recording medium 100 or a storage unit within the information processing device 600 such as a hard disk or the like.

Also, the CPS unit B650 is a contents management unit including AV stream contents such as moving pictures or the like of a movie or the like, wherein the information processing device 600 obtains new data 651 made up of caption data corresponding to the AV stream content from the server 611, and performs playing. The obtained caption data 651 is subjected to processing for setting as configuration data of the CPS unit B 650 at the information processing device 600, and is stored in the information recording medium 100 or a storage unit within the information processing device 600 such as a hard disk or the like.

Note that in either case, an arrangement may be made wherein a new CPS unit is set for the newly generated or obtained data, and stored in the information recording medium 100 or a storage unit within the information processing device 600 such as a hard disk or the like as configuration data of the set new CPS unit. CPS units corresponding to new data described earlier with reference to FIG. 2 are set correlated to these units. A recording seed Vu corresponding to each CPS unit is stored beforehand in the information recording medium, with the recording seeds being applied to generate CPS unit keys by executing a predetermined encryption processing sequence, and the generated CPS unit keys being applied to execute encryption of the generated data or obtained data, which is stored in the information recording medium 100 or a storage unit within the information processing device 600 such as a hard disk or the like.

Note that the recoding seed Vu corresponding to newly-set CPS units may be obtained form an external server. However, preferably, predetermined authentication processing should be executed between the server providing the recording seed Vu and the information processing device, to prevent unauthorized recording seeds from being obtained. Now, the recording seed Vu being obtained includes obtaining in increments to management tables such as shown in FIG. 2.

Encryption and managing forms of newly generated data or obtained data will be described with reference to FIG. 10.

Figure 10:
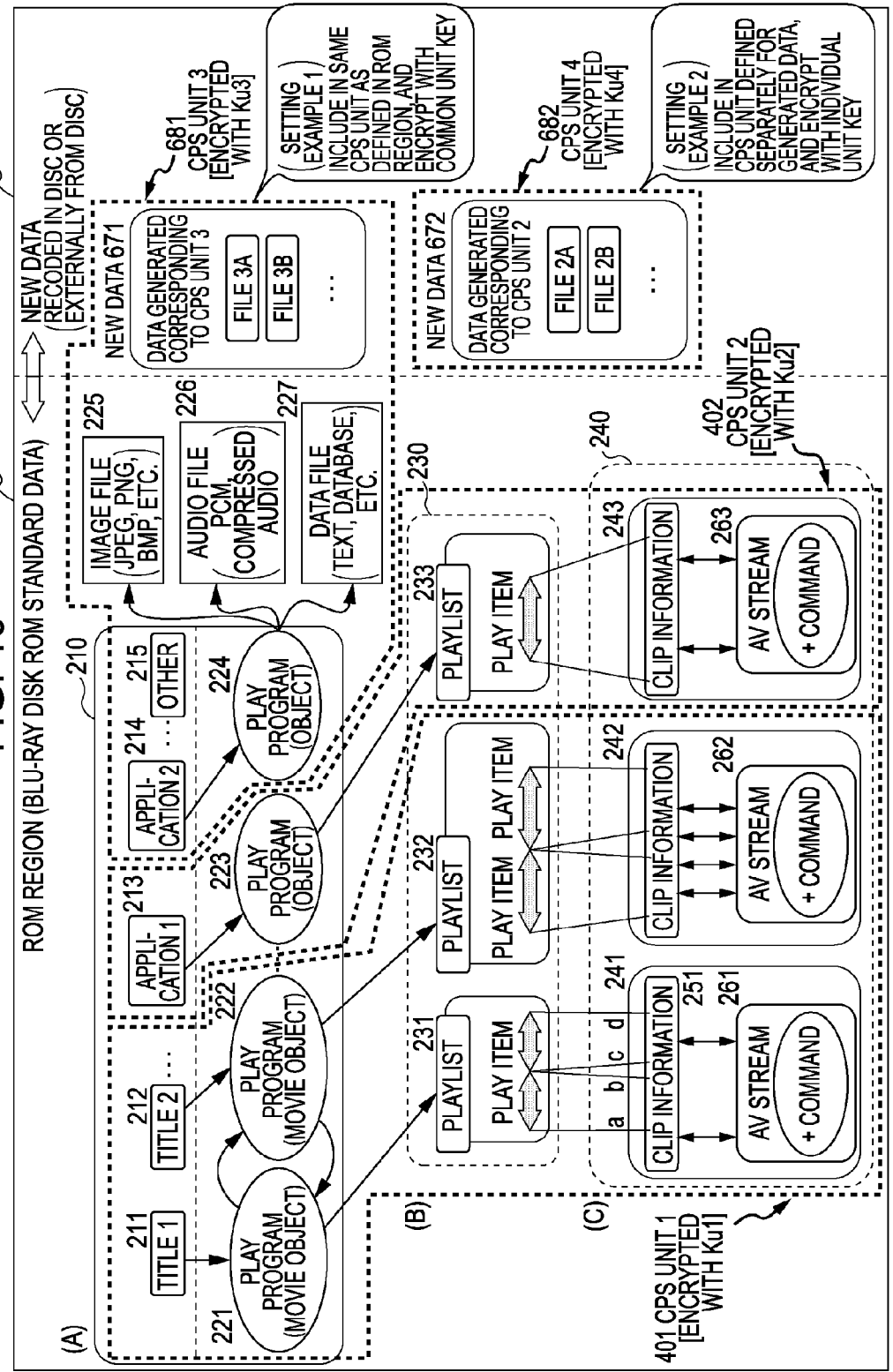
FIG. 10 is a diagram for describing the relation between new data generated or obtained, and CPS units, with the information processing device.

FIG. 10 illustrates an example of a data encryption method in the event of recording, within the information recording medium or externally, data generated or obtained corresponding to playing processing of contents stored in the information recording medium.

In FIG. 10, the data region to the left side is data which has already been stored in the information recording medium, i.e., ROM region data 660, and the data region to the right side is new data 670 which is newly generated or obtained data. The newly generated or obtained data is stored in a data-writable region of the information recording medium, or in a hard disk or in external storage means such as portable memory or the like. FIG. 10 illustrates two examples of CPS unit setting examples with regard to the newly generated or obtained data.

SETTING EXAMPLE 1

As can be seen from the CPS unit 3, 681, shown in FIG. 10, this is a processing example of integrating the new data 671 into CPS units which have been already set in the information recording medium.

The CPS unit 3, 681 is data already stored in the information recording medium, i.e., the CPS unit 3 which has already been set in the data region 660, and is of a configuration wherein the new data 671 that has been newly generated or obtained is all integrated into the CPS unit 3, 681, to form a single unit. In this case, the new data 671, or data contained in the new data 671, is encrypted using the unit key Ku3 generated applying the recording seed Vu3 set corresponding to the CPS unit 3, and is stored in the information recording medium or a storage unit such as a hard disk.

This configuration example is of a configuration wherein the generated data is encrypted using the same key as the unit key corresponding to the already-defined CPS unit in the ROM region of the information recording medium, so at the time of paling processing, the same key as that of the data included in the already-defined CPS unit in the ROM region of the information recording medium can be applied to execute decryption processing of the new data 671, thereby enabling seamless reproduction with no need to switch over keys.

SETTING EXAMPLE 2

As can be seen from the CPS unit 4, 682, shown in FIG. 10, this is a processing example of setting a new CPS unit different from the CPS units which have been already set in the information recording medium, and managing the new data 672 there.

Thus, a CPS unit 4, 682, is defined for the new data 672, and encryption of data contained in the new data 672 is performed using a key corresponding thereto. The CPS unit 4, 682 is managed independently from the data recorded in the information recording medium. In this case, there is the need to separately set and record information, for assigning a CPS unit to the new data 672 and information for generating a unit key, as management information.

A setting example of reproduce/copy control information as management data corresponding to the new data newly generated or obtained, will be described with reference to FIG. 11.

Figure 11:
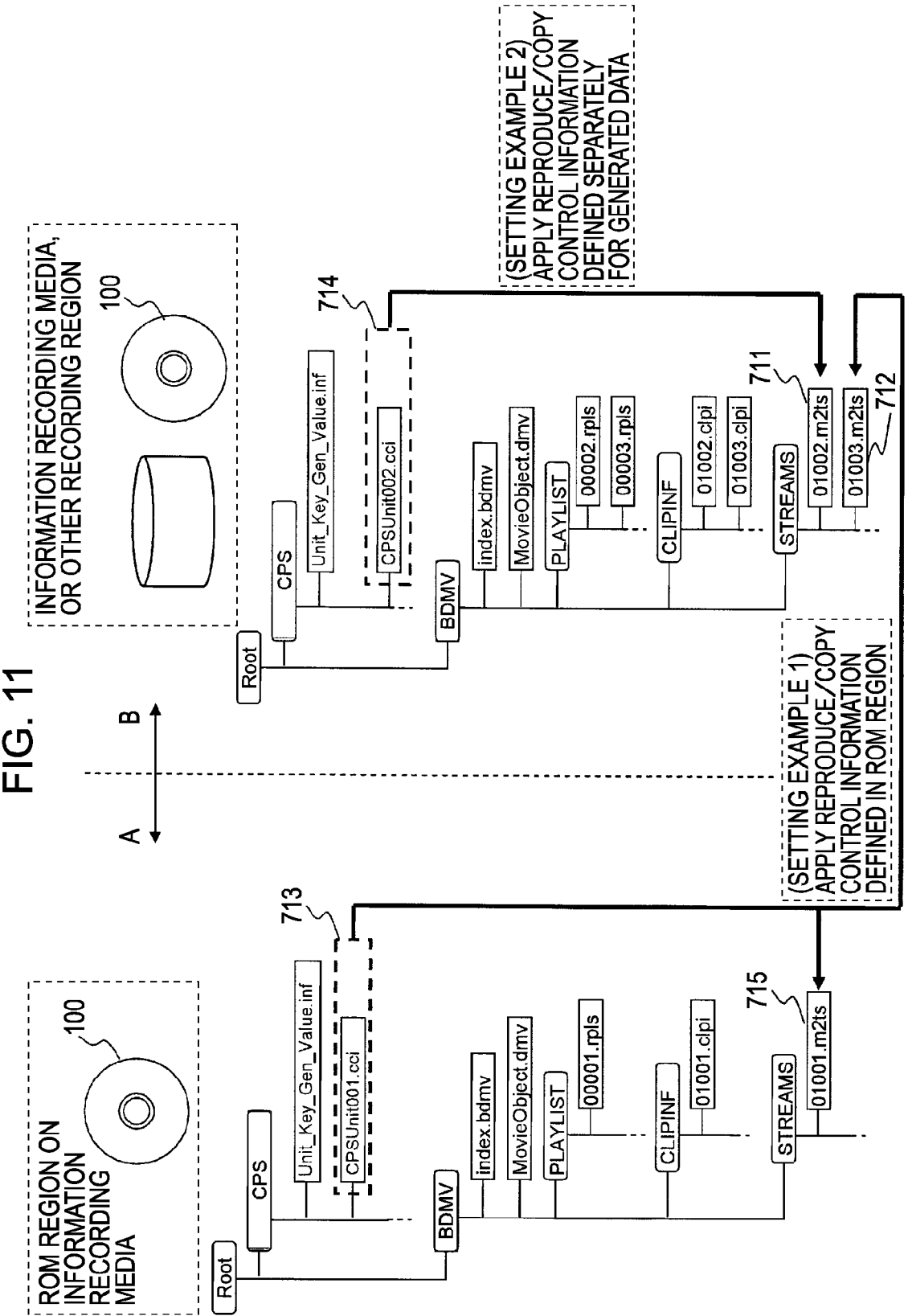
FIG. 11 is a diagram for describing a setting example of reproduction/copy control information of new data generated or obtained with the information processing device.

FIG. 11 illustrates a directory A corresponding to a CPS management unit configuration stored in the information recording medium 100 beforehand, and a directory B corresponding to new data which as been newly generated or obtained. In the example shown in FIG. 11, various data is set in a [BDMV] directory as contents following the Blu-ray Disc ROM standard format in either case, and various types of management data are stored in the [CPS] directories.

For the method for recording the reproduce/copy control information, one of the following two setting examples is applied.

SETTING EXAMPLE 1

Already-existing reproduce/copy control information is applied as the reproduce/copy control information for the new data.

Here, the data [01001.m2ts] 715 of the CPS unit 001 stored in the information recording medium 100 beforehand, is applied without change as the reproduce/copy control information corresponding to the newly generated or obtained new data [01003.m2ts] 712. In this case, there is no need to newly generate the information corresponding to the new data [01003.m2ts] 712, so the reproduce/copy control information [CPSUnit001.cci] 713 of the CPS unit 001 is set as reproduce/copy control information to be applied to both the already-existing data [01001.m2ts] 715 and the new data [01003.m2ts].

SETTING EXAMPLE 2

Reproduce/copy control information for new data is newly generated.

As shown in FIG. 11, this is an example of generating new reproduce/copy control information [CPSUnit002.cci] 714, as reproduce/copy control information corresponding to the new data [01002.m2ts] 711, and taking this as management data.

The case of (Setting Example 1) is a method suitable for downloading and obtaining caption data not recorded in the ROM region of the information recording medium 100, for example, and reproducing this with the picture and audio data recorded in the ROM region. In this case, it would be natural to perform processing considering the data recorded in the ROM region and the downloaded data to belong to a single CPS unit.

Also, the case of (Setting Example 2) is suitable for enabling data generated by executing an application program read out from the information recording medium 100 to be shared/copied amount multiple users. While data recorded in the ROM region, such as execution applications and AV streams, cannot be copied, data generated by executed applications (sending game score information, map information, or the like, to other users, and information to be checked out to portable devices) can be subjected to reproduction/copy control that differs from that of the ROM region.

Figure 12:
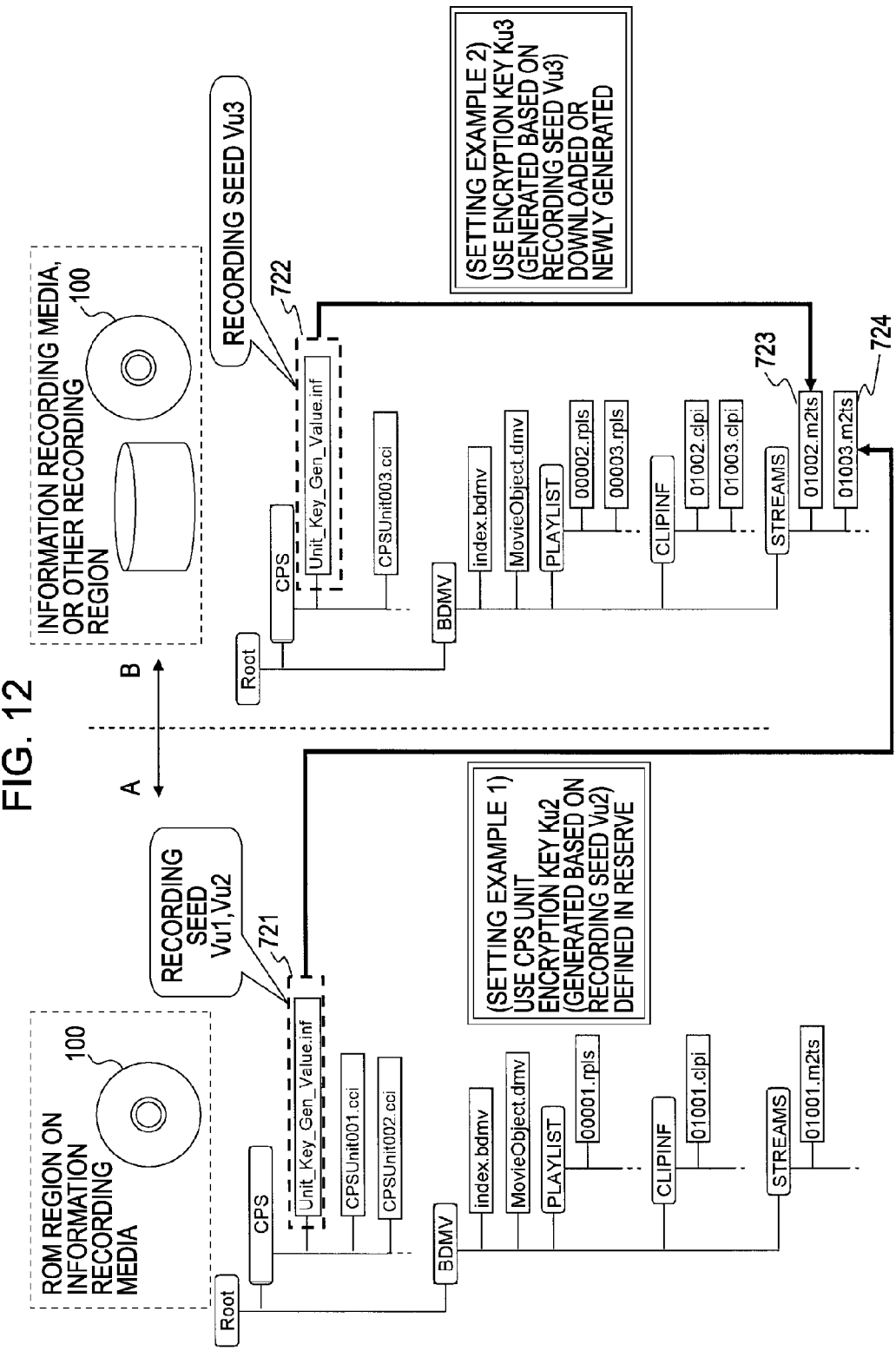
FIG. 12 is a diagram for describing a setting example of encryption key information for new data generated or obtained with the information processing device.

FIG. 12 is a diagram illustrating a setting example for encryption keys, i.e., generating information for unit keys corresponding to each CPS unit.

As with the case of FIG. 11, a directory A corresponding to a CPS management unit configuration stored in the information recording medium 100 beforehand, and a directory B corresponding to new data which as been newly generated or obtained, are shown. In the example shown in FIG. 12, various data is set in a [BDMV] directory as contents following the Blu-ray Disc ROM format in either case, and various types of management data are stored in the [CPS] directories.

As described earlier with reference to FIG. 2, recording seeds are correlated with CPS unit identifiers (CPS unit IDs) in the CPS unit management table, and thus managed. The encryption key information [Unit_Key_Gen_Value.inf] 721 shown in FIG. 12 is a CPS unit management table stored in the information recording medium 100.

For the setting method of the recording seed corresponding to the CPS unit set corresponding to the new data, one of the following two setting examples is applied.

SETTING EXAMPLE 1

A new data recording seed set beforehand in the CPS unit management table is used as the recording seed serving as encryption key generating information for the new data.

This is a configuration wherein a recording seed which has been set in the new data fields 121 (see FIG. 2) in the CPS unit management table described earlier with reference to FIG. 2, is used as the recording seed for the new data, so as to serve as the encryption key generating information. The recording seed already set to the new data field 121 (see FIG. 2) of encryption key information [Unit_Key_Gen_Value.inf] 721 which is management table data stored in the information recording medium 100, is correlated to the new data [01003.m2ts] 724 in FIG. 12. In this setting example, a new CPS unit can be defined, with an already-set recording seed being applied to the new data field 121 (see FIG. 2).

SETTING EXAMPLE 2

A newly generated or obtained recording seed is used as the recording seed serving as encryption key generating information for the new data. In FIG. 12, encryption key information [Unit_Key_Gen_Value.inf] 722 is set as new management table data corresponding to the new data [01002.m2ts] 723, where the newly-set CPS unit identifier and the generated or obtained recording seed are stored as new entries, in a correlated manner. Note that in the event that generating recording seeds is permitted, the information processing device generates new recording seeds at the data processing unit within the information processing device, by generating random numbers, for example. In this setting example, unlimited CPS units can be set and recording seeds can be generated regarding new data.

Also, while setting a new CPS unit necessitates correlation of management corresponding to the newly-set CPS unit, i.e., of reproduce/copy control information, to which is applied one or the other of the two techniques in FIG. 11 described above, i.e., correlating already-existing reproduce/copy control information or setting and correlating new reproduce/copy control information.

[5. Encryption and Tamper-Proofing Configuration of Navigation File]

With the examples described with reference to FIG. 11 and FIG. 12, an encryption configuration of only the AV stream data file within the new data has been described. These are configuration examples wherein, for example, AV stream data such as the new data [01002.m2ts] 711 and the new data [01003.m2ts] 712 are encrypted and stored in a data writable region in the information recording medium or in a hard disk or in external storage means such as portable memory or the like.

However, the new data is not restricted to AV stream data, and also includes files such as title indexes, movie objects, playlist files, clip information files, and so forth. A configuration is preferable wherein these files as well are accessible only from authorized reproducing application software, with access from outer various applications operating of PCs, for example, being eliminated. Also, a configuration enabling tamper-proofing and tampering verification regarding files including AV stream data is preferable. Note that files other than AV stream files, i.e., title indexes, movie objects, playlist files, and clip information files are collectively referred to as navigation files. The encryption storage configuration of these navigation files, and tamper-proofing by providing electronic signature data, will be described with reference to FIG. 13 and FIG. 14.

Figure 13:
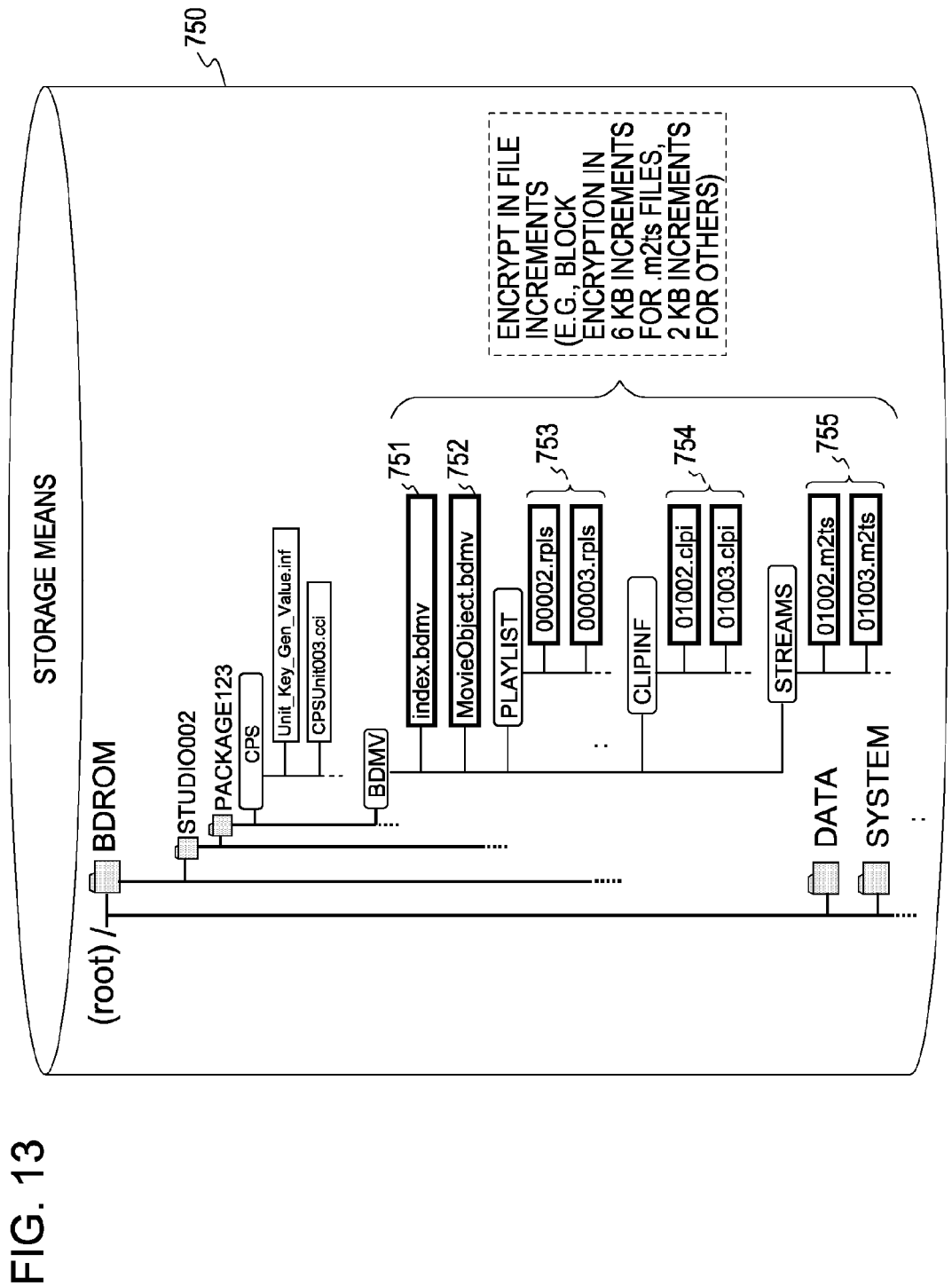
FIG. 13 is a diagram for describing an encryption storage processing configuration of navigation files.

FIG. 13 is a diagram for describing a configuration example of individually encrypting and storing each file of AV stream data files, and also files other than AV stream files, i.e., title indexes, movie objects, playlist files, and clip information files, which are navigation files.

The storage means 750 shown in FIG. 13 is equivalent to the data writable region in the information recording medium or a hard disk or external storage means such as portable memory or the like, for storing the new data. Examples of new data stored in the storage means 750 include, in addition to the AV stream files 755 shown in the drawing, title index file 751, movie object file 752, playlist files 753, and clip information files 754, which serve as navigation files other than AV data streams. All of the navigation files and AV stream data files are encrypted in stored in increments of files. The playlist files 753 and clip information files 754 are set as individual files for each CPS unit, as with the AV stream data files 755, and encryption is executed in increments of files.

The configuration preferably enables the encryption key to be applied for encryption processing to be generated or obtained only by reproduction application software which has an authorized license. For example, information which only reproduction application software which has an authorized license can obtain is used as the encryption key, or an encryption key is generated based on such restricted information. One specific example thereof is a configuration wherein the unit keys corresponding to the CPS units are applied as encryption keys. The AV stream files 755 shown in FIG. 13, as well as the title index file 751, movie object file 752, playlist files 753, and clip information files 754, which are navigation files other than AV streams, are each subjected to encryption applying unit keys correlated to the CPS units to which of the files belong, and are stored.

Further, a configuration may be made wherein unit keys corresponding to CPS units are not used, with other information being used as key generating information. However, a configuration wherein encryption key generating by other applications besides authorized reproducing applications which have been permitted to reproduce data files of the CPS units, is undesirable. Accordingly, information obtainable only by reproduction application software which has an authorized license is set as key generating information. An example of information only obtainable by reproduction application software which has an authorized license is a device ID.

A device ID is an ID set corresponding to reproduction application software which has an authorized license, and is generated based on identification information set in hardware, which is a device in which the reproduction application has been validly installed. The device ID can only be obtained by a program recorded in the authorized reproduction application software which has been validly installed.

Accordingly, the device ID is data which can only be obtained or generated by reproduction application software which has an authorized license, and obtaining by other applications with a PC in which various types of application software are installed for example, is eliminated. In the event of generating or obtaining new data, a valid reproduction application obtains the device ID and executes encryption key generating processing to generate an encryption key, and applies the generated encryption key to encrypt each of the AV stream files 755 as well as the title index file 751, movie object file 752, playlist files 753, and clip information files 754, which are navigation files other than AV streams, and stores each in the storage means 750. An example of an encryption key generating algorithm is the AES encryption key generating algorithm, or the like. Specifically, a configuration is employed wherein block encryption is performed in 6 KB increments for the AV stream files 755 which have great data amounts, and block encryption is performed in 2 KB increments for the other navigation files.

In the event of decrypted an encrypted file, the device ID is obtained by the valid reproduction application software, an encryption key is generated, and decryption processing of the encrypted file is executed using the generated encryption key.

Note that the configuration is not restricted to the above-described device ID, and may generate encryption keys by combining other information, such as for example, a studio ID serving as an identifier of an editing studio of the stored contents of the information recording medium storing CPS unit management content, a package ID serving as a package identifier as a manufacturing unit of the information recording medium, and volume ID, with the device ID.

Note that in the event files relating to various studios (content providing entities) are set in the directory set for the new file, the studio IDs corresponding to each of the files are preferably applied. This holds the same for applying package IDs and volume IDs as well. In the event of applying such various IDs as encryption key generating information, a configuration is necessary that is capable of distinguishing which studio ID, package ID, and volume ID, a key, which has been applied to the new file set in the directory, has been generated based upon.

While a configuration may be made wherein the studio ID or the like used as generating information for the encryption key for the new data file is used as a directory name or file name with no change, such settings may possibly allow the studio name and the like to be found out at the time of reproducing the content, and accordingly encryption key generating information might be analogically inferred from the data found out. In order to avoid this, a configuration is preferably implemented wherein the directory name and file name are determined using separately-assigned numbers or random numbers, with the correlation between the encryption key generating information such as studio ID and the like being saved as a separate table.

Further, in order to prevent data tampering and enable tampering verification of the AV stream files 755, and also the title index file 751, movie object file 752, playlist files 753, and clip information files 754, which are navigation files other than AV streams, a hash value is calculated for the entirety of the new data, or the new data divided into certain sizes (e.g., 64 KB), at the time of storing the new data, and the generated hash value is encrypted with the above-described encryption key and stored. This hash value calculation processing and encryption processing are also executed by the reproduction application which has an authorized license.

As with the above-described encryption for file encryption, encryption of the hash value is performed applying the unit key set corresponding to the CPS unit, or an encryption key generated based on the device ID or a combination of the device ID and at least one of the studio ID, package ID, and volume ID.

At the time of reproducing data, the hash value obtained by decrypting the encrypted hash value, and the hash value recalculated based on the file to be reproduced, are matched, and in the event that both hash values agree, determination is made that there has been no tampering of the file. Under the condition that there is no tampering of the file, usage of the file, and usage of new files and new data, is permitted. Note that these are processed by valid reproduction application software.

Next, description will be made with reference to FIG. 14 regarding a configuration example wherein, of the new data, only the AV stream data files are encrypted, and the title index file, movie object, playlist files, and clip information files, which are other navigation files, are not encrypted but are stored as file to which a signature has been set for data tamper-proofing and verification.

Figure 14:
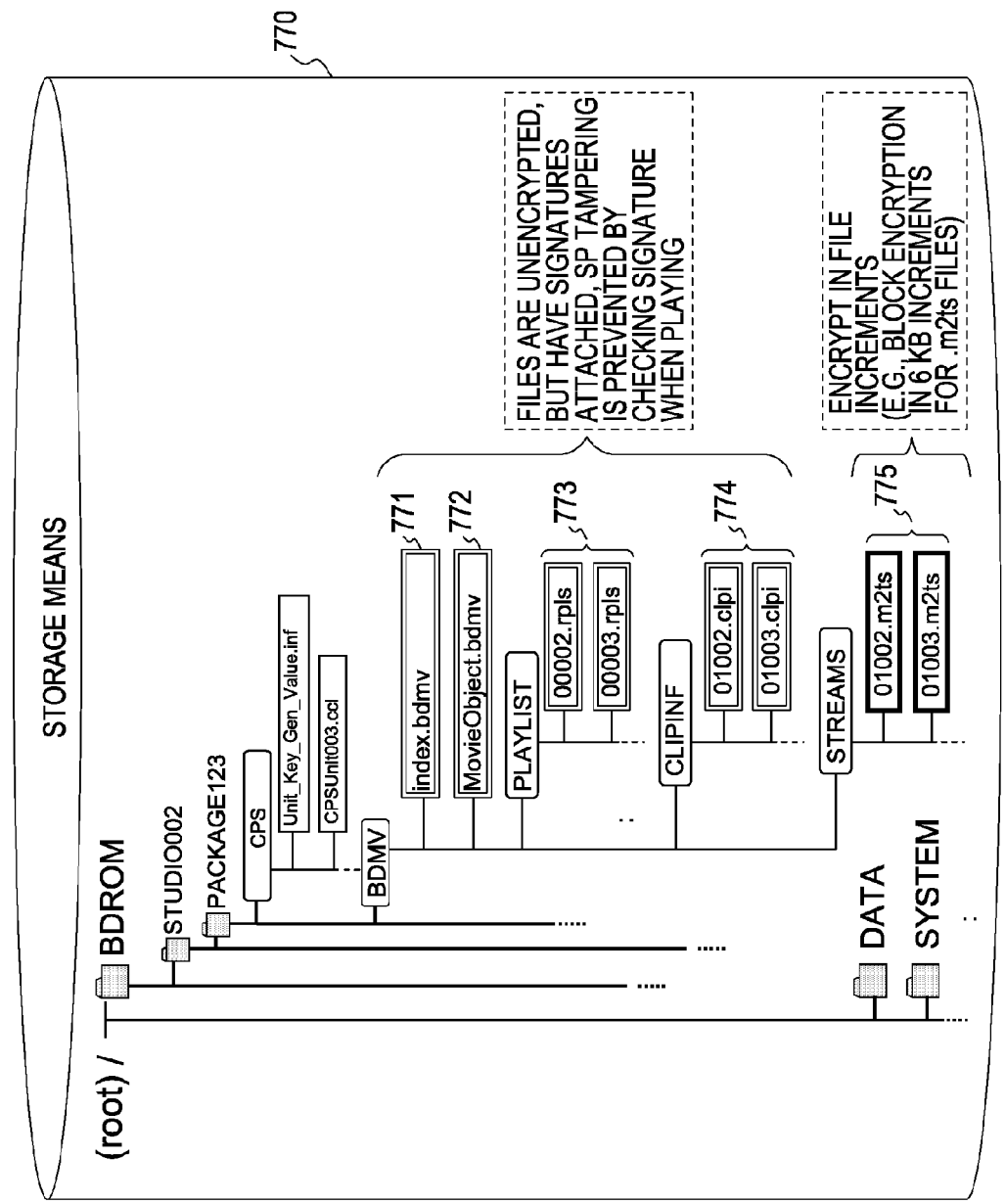
FIG. 14 is a diagram for describing a storage processing configuration for preventing tampering and enabling tampering verification of navigation files.

The storage means 770 shown in FIG. 14 is equivalent to the data writable region in the information recording medium or a hard disk or external storage means such as portable memory or the like, for storing the new data. New data stored in the storage means 770 include, in addition to the AV stream files 775 shown in the drawing, title index file 771, movie object file 772, playlist files 773, and clip information files 774, which serve as navigation files other than AV streams.

With the example shown in FIG. 14, only the AV stream data files 775 are encrypted in increments of files. The encryption key applied is the unit key set corresponding to the CPS unit, or an encryption key generated based on the device ID or a combination of the device ID and at least one of the studio ID, package ID, and volume ID, as with the description made with reference to FIG. 13.

The title index file 771, movie object file 772, playlist files 773, and clip information files 774, which are navigation files other than the AV stream data files 775, are not encrypted.

However, these navigation files are attached with an electronic signature enabling data tamper-proofing and tampering verification, and stored.

In the event of obtaining such new data by downloading from an external server, such as a server managed by a studio for example, this is obtained as data which has been provided with a signature in the server beforehand. In this case, a signature verification key is either obtained together or obtained separately. Or, a configuration may be made wherein an own electronic signature is generated at an application executed by the data processing unit of the information processing device, as to the downloaded data or the new data generated in itself.

The signature generating key and signature verifying key may be the unit key set corresponding to the CPS unit, or have a configuration of a key generated based on the device ID or a combination of the device ID and at least one of the studio ID, package ID, and volume ID, as with the above-described encryption key. Or, a configuration may be made wherein a pair of a secret key and public key following the public key encryption method are applied as the signature generating key and verifying key, respectively.

In the event of using a file which has been provided with a signature, signature verification processing of the file which has been provided with a signature is performed, thereby determining whether or not the file data has been tampered with. File usage is permitted under the condition that there has been no file tampering. Note that these are processed by valid reproduction application software.

In this way, the information processing device according to the present invention executes valid application software at the data processing unit, and executes encryption processing of AV stream data files including new data, and control information or navigation files including programs to be applied to playing processing of AV stream data, which are stored in storage means. Or, these are stored in storage means as files correlated to tampering verification data such as hash value or electronic signature data. At the time of using these files, tampering verification is performed, and the files are used under the condition that confirmation has been made that there is no data tampering.

According to the present configuration, usage of data files and navigation files corresponding to CPS units, unauthorized content usage such as modifying data, and tampering processing, using applications other than licensed applications on a device capable of using various types of application software such as a PC for example, can be prevented, and unauthorized usage of data corresponding to CPS units, including navigation files, can be eliminated.

[6. Storage Processing of New Data Generated or Obtained by Information Processing Device]

Figure 15:
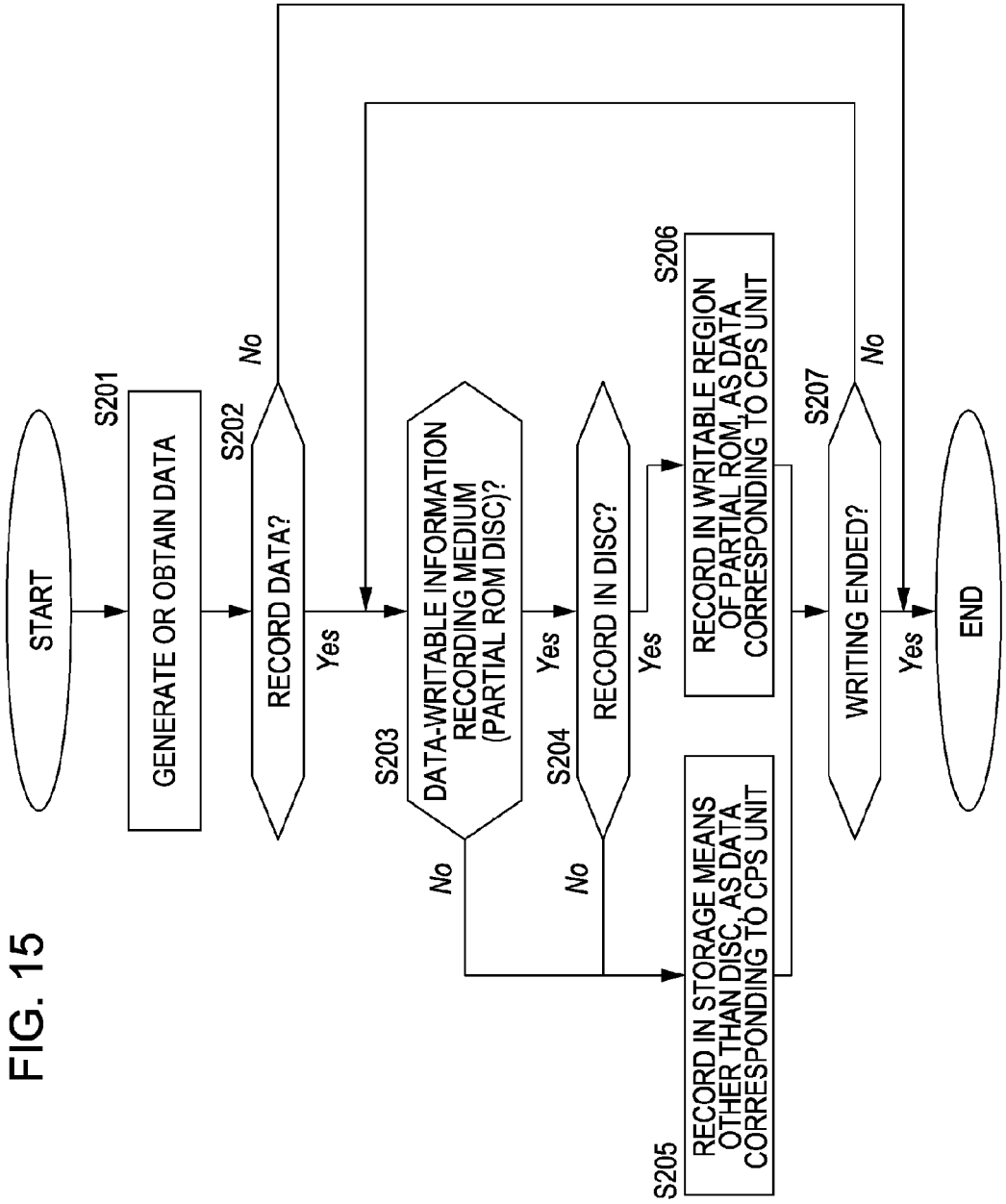
FIG. 15 is a flowchart for describing a write processing sequence of new data generated or obtained with the information processing device.

Next, the storing processing sequence of new data which the information processing device has generated or obtained will be described with reference to the flowchart shown in FIG. 15.

The saving target of the new data which the information processing device has generated or obtained is one or the other of a data writable region set in the information recording medium storing the CPS unit management data, or an external storage region.

A storage region external from the information recording medium is, for example, a hard disk built into the information processing device, portable media such as a memory card, or the like. The storage region within the information recording medium is processing in the case of applying an information recording medium having a data writeable region, such as in a case that the information recording medium is a Blu-ray disc for example, and is a partial ROM disc having two regions, a reproduction-only region (ROM) and a write-only region.

In a case of applying an information recording medium having a data writable region, as with a partial ROM disc, the saving target can be selected from the two of the information recording medium or an external storage region, but in the case of not applying an information recording medium having a data writable region, the generated data is saved to a storage region other than the information recording medium, as a matter of course.

The storing processing sequence of new data which the information processing device has generated or obtained will be described with reference to the flowchart shown in FIG. 15.

In step S201, new data is generated or obtained, following data or a program which the information processing device has read from the information recording medium. Determination is made in step S202 regarding whether or not to execute recording of the data. This determining processing is determined by user input from data input means, for example. Or, automatic determining processing may be executed based on preset information.

In the event of not recording data, the processing ends without performing recording processing. In the event of performing data recording, the flow proceeds to step S203, and determination is made regarding whether or not the information recording medium mounted on the information processing device is an information recording medium having a data writable region such as a partial ROM disc.

In the event that the information recording medium does not have a data writable region, the flow proceeds to step S205, and the generated or obtained data is stored in storage means other than the information recording medium, as CPS unit configuration data correlated to that data. Note that in this data storage processing, reproduce/copy control information, and a recording seed in the CPS unit management table, serving as CPS unit management information corresponding to the stored data, are correlated. The configuration of this correlation will be described later.

In step S203, in the event that determination is made that the information recording medium mounted to the information processing device is an information recording medium having a data writable region as with a partial ROM disc, the flow proceeds to step S204, and determination is made regarding whether or not to write data to the information recording medium. This is executed as determination processing based on user input information, for example. Or, this may be executed as automatic determination processing based on preset information.

In the event that data writing is not to be performed to the information recording medium, the flow proceeds to step S205, and data is stored in storage means other than the information recording medium, as data corresponding to the CPS unit correlated to the generated or obtained data.

In the event of writing data to the information recording medium, the flow proceeds to step S206, and the generated or obtained data is stored in the information recording medium as data corresponding to the CPS unit. Note that in this data storage processing, reproduce/copy control information, and a recording seed in the CPS unit management table, serving as CPS unit management information corresponding to the stored data, are correlated.

[7. Configuration for Correlating CPS Unit Configuring Data in an Information Recording Medium and CPS Unit Configuring Data Stored Outside of an Information Recording Medium]

As described above, new data which is not stored as original data in the information recording medium storing the contents managed by the CPS units is stored in the information recording medium or in a hard disk or the like. In order to handle this new data as managed data of the CPS management data in the information recording medium, the new data stored in the information recording medium ort the hard disk or the like must be identifiable as managed data of the CPS management data in the information recording medium. The following is a description of this identification configuration.

FIG. 16 is a diagram illustrating a configuration of correlating new data and a CPS unit in a configuration wherein new data is stored in storage means other than the information recording medium having the original CPS units, e.g., a hard disk of the information processing device, for example.

In the event of recording new data in storage means other than the information recording medium having the original CPS units, as shown in FIG. 16, the new data corresponding to different information recording mediums 801 and 802 each having CPS units is stored in a single storage means 803 such as a hard disk.

In this case, the various types of new data stored in the storage means 803 need to be distinguished regarding which information recording medium 801 and 802 each new data corresponds to.

As described earlier with reference to FIG. 1, the information recording mediums 801 and 802 have stored therein a studio ID serving as an identifier of an editing studio of the stored contents of the information recording medium 100, and a package ID serving as a package identifier as a manufacturing unit of the information recording medium 100.

As shown in FIG. 16, the studio ID, package ID, and further CPS unit ID are given to the various new data 804, 805, and 806, stored in the storage means 803, to serve as identification data, with a directory hierarchical structure being set in the order of studio ID, package ID, and CPS unit ID, and data is stored and managed based on this directory hierarchical structure.

Generated data can be saved in arbitrary format within the directory assigned to each CPS unit ID. For example, in the event of data generated by an execution application such as Java or the like, it is sufficient for the data to be in a format which can be interpreted by the execution application such as Java at the time of reproduction, and is not bound to any particular format.

Figure 17:
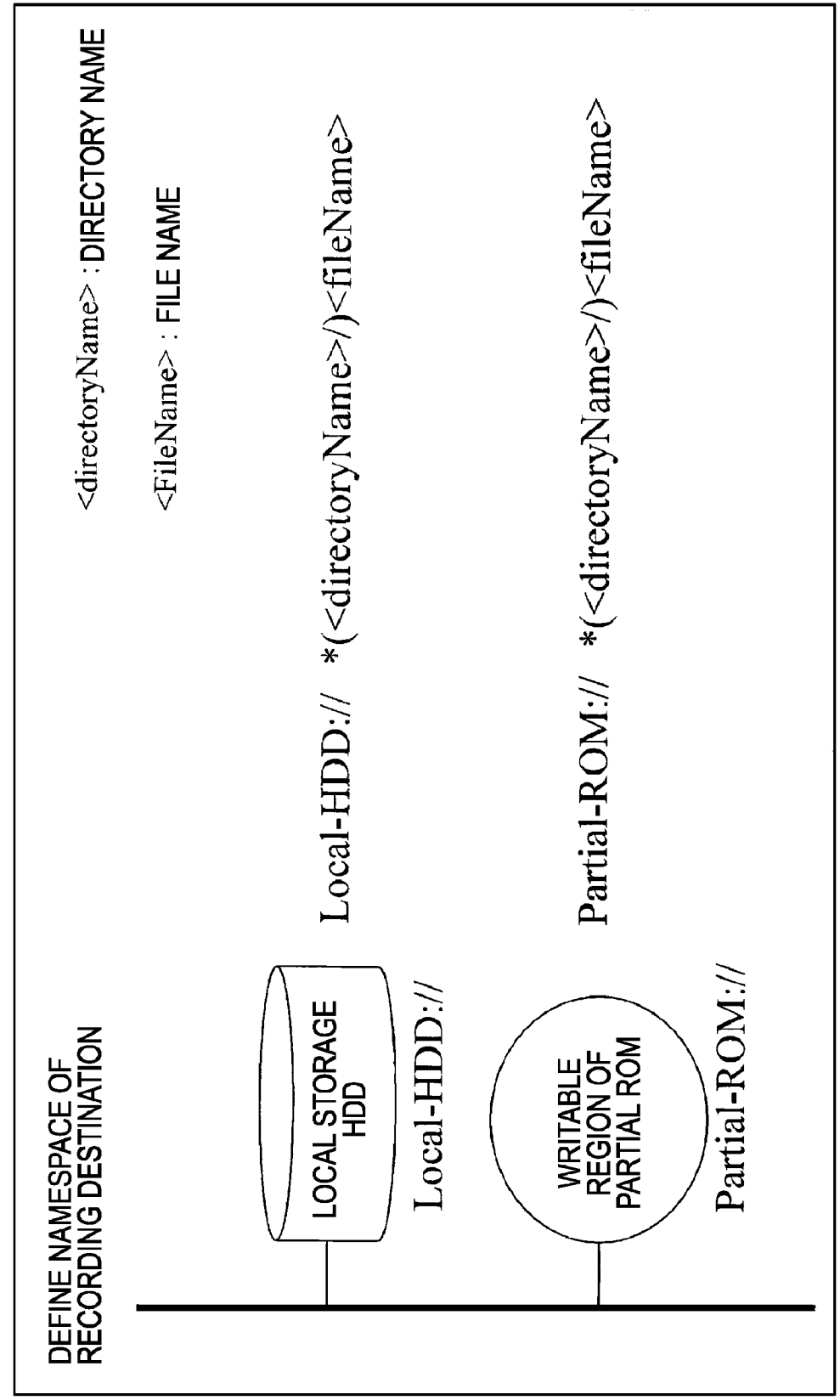
FIG. 17 is a diagram for describing a configuration for identifying as a CPS unit and obtaining new data generated or obtained with the information processing device.

In the event of stipulating such a directory hierarchy, reference processing performed in the case of calling the data recorded in the storage means other that the information recording medium having the original CPS units from the execution program such as Java or the like can be executed as processing for calling up based on namespace, directory, and file name, as shown in FIG. 17 for example. That is to say, the namespace of the data writing region of the information recording medium having the original CPS units is defined such as [Partial-ROM://], and for the hard disk such as [Local-HDD://], and each storage file for new data can be determined by namespace, direction, and file name, enabling processing such as reading, updating, and rewriting of the file data.

Figure 18:
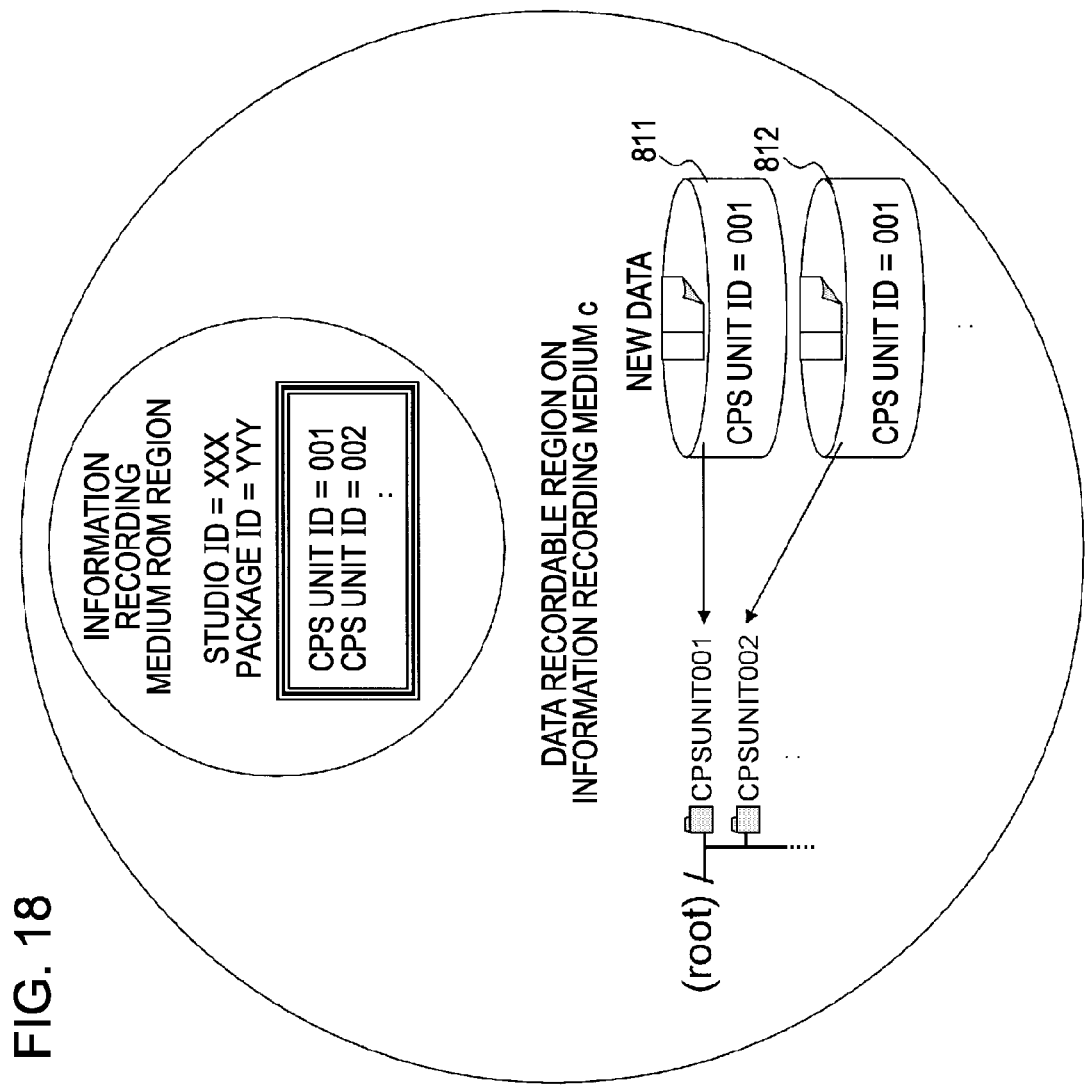
FIG. 18 is a diagram for describing a configuration for identifying as a CPS unit new data generated or obtained with the information processing device.

Next, the configuration for correlating new data and CPS units in the event of writing new data to the data writable region of an information recording medium having the original CPS units will be described with reference to FIG. 18.

In the event of writing new data to the data writable region of an information recording medium having the original CPS units, there is no need for managing the generated data over multiple packages as described with reference to FIG. 16. Accordingly, there is no need for directory management using studio ID and package ID, and as shown in FIG. 18, the new data 811 and 812 is managed as identifiable data by the CPS unit ID.

[8. Processing Configuration Restricting Program Execution Conditions]

Next, a configuration will be described for preventing unauthorized content usage and content copying, stipulating that the information recording medium be an information recording medium having the original CPS unit or be of a particular type of information recording medium, as conditions for executing a program, such as a Java application program or the like, readable from the information recording medium storing contents managed by the CPS unit.

Figure 19:
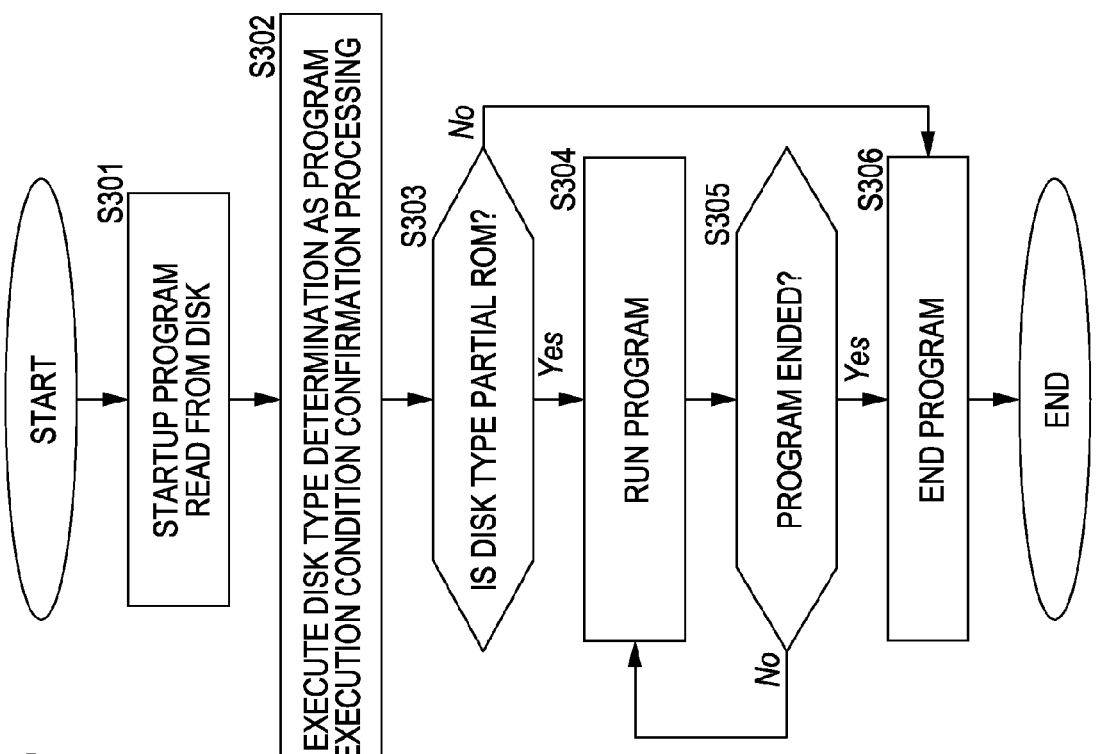
FIG. 19 is a flowchart for describing a processing sequence for restricting execution of a program based on the type of information recording medium.

A processing sequence for program execution under the condition that the information recording medium is an information recording medium having the original CPS unit will be described with reference to FIG. 19. This processing is processing executed in the information processing device at the time of mounting an information recording medium storing contents managed by the CPS unit.

In step S301, the information processing device to which the information recording medium storing the contents managed by the CPS unit has been mounted activates the program read out from the information recording medium, and in step S302 executes disc type determination as program execution condition configuration processing. This is executed based on disc type identification information 106 (see FIG. 1) recorded in the physical region of the information recording medium, for example.

In step S303, determination is made regarding whether or not the disc type is partial ROM. In the event that the disc type is not partial ROM, the flow proceeds to step S306, and execution of the program is cancelled and the processing ends.

In the event that the disc type is partial ROM, the flow proceeds to step S304, and the program is executed. Following configuration of ending of the program in step S305, the processing ends.

Figure 20:
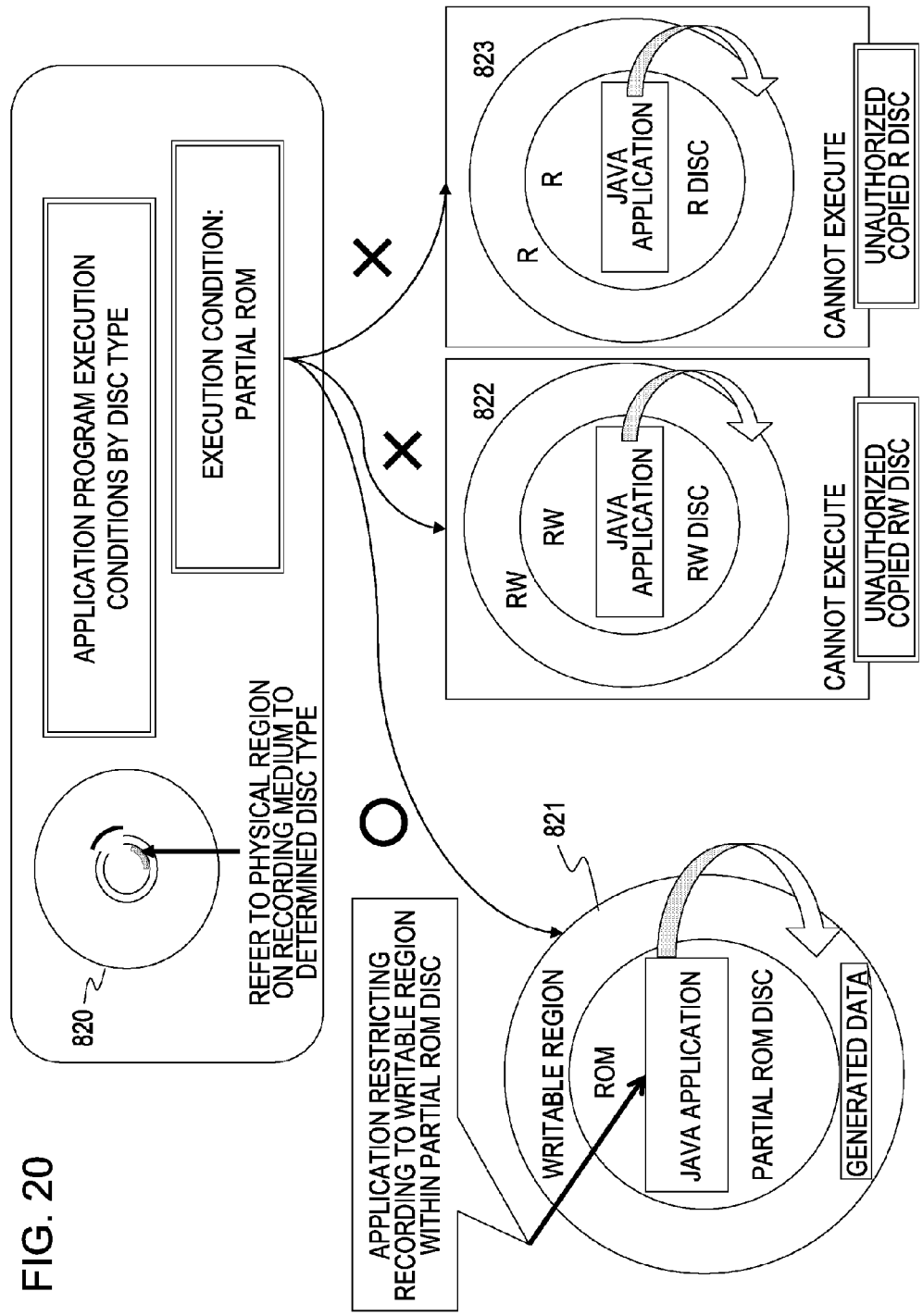
FIG. 20 is a diagram for describing a specific example of processing for restricting execution of a program based on the type of information recording medium.

FIG. 20 is a diagram for describing an example of execution permitted/not-permitted settings for a program corresponding to specific information recording medium type.

The information processing device obtains disc type identification information of an information recording medium from the physical region of the mounted information recording medium 820. This type information includes information including the disc type, such as partial ROM disc, data writable RW disc, or R disc, or so forth, for example.

At the time of starting execution of a program (e.g., Java) read from the information recording medium 820, the information processing device determines the type of the information recording medium 820, and only in the event that the type is partial ROM permits execution of the program, while canceling execution of the program in the event that the disc is another RW disc or R disc or the like.

Due to this processing, in the event that the partial ROM 821 is mounted in the information processing device as shown in the drawing, programs read from the partial ROM 821 are executed, but in the event that the disc is another RW disc 822 or R disc 823, execution of the program read out is not permitted, even if the same program has been written therein.

Accordingly, in the event that the information recording medium having the original CPS unit is a partial ROM 821, and data copying is executed to generate a RW disc 822 or an R disc 823, program execution is not permitted, thereby preventing usage of copied contents.

Now, while the above-described processing example is an example for determining whether or not to permit execution of programs based on the type of the information recording medium, this may be made as a configuration to restrict the target for writing new data as well. Also, while the above-described processing example is an example described as processing applying a partial ROM disc, the same processing can be performed in a case of applying a ROM disc as well.

In the event that the information recording medium is a partial ROM, the new data can be written to the data writable region of the partial ROM, but in the event of executing a program read out from the partial ROM, the write target of the new data such as data generated or data obtained based on the execution of the program is stipulated based on the program. That is to say, the write target of the data generated or obtained based on execution of the program read out from the partial ROM is restricted to only the data write region of the same partial ROM. This is realized by setting write conditions to the program. Due to such a configuration, usage restriction of data which the user has newly generated or obtained can also be realized.

[9. Configuration Example of Information Processing Device]

Next, a configuration example of an information processing device for performing reproducing and recording processing on the information recording medium storing contents managed by the above-described CPS units will be described.

Figure 21:
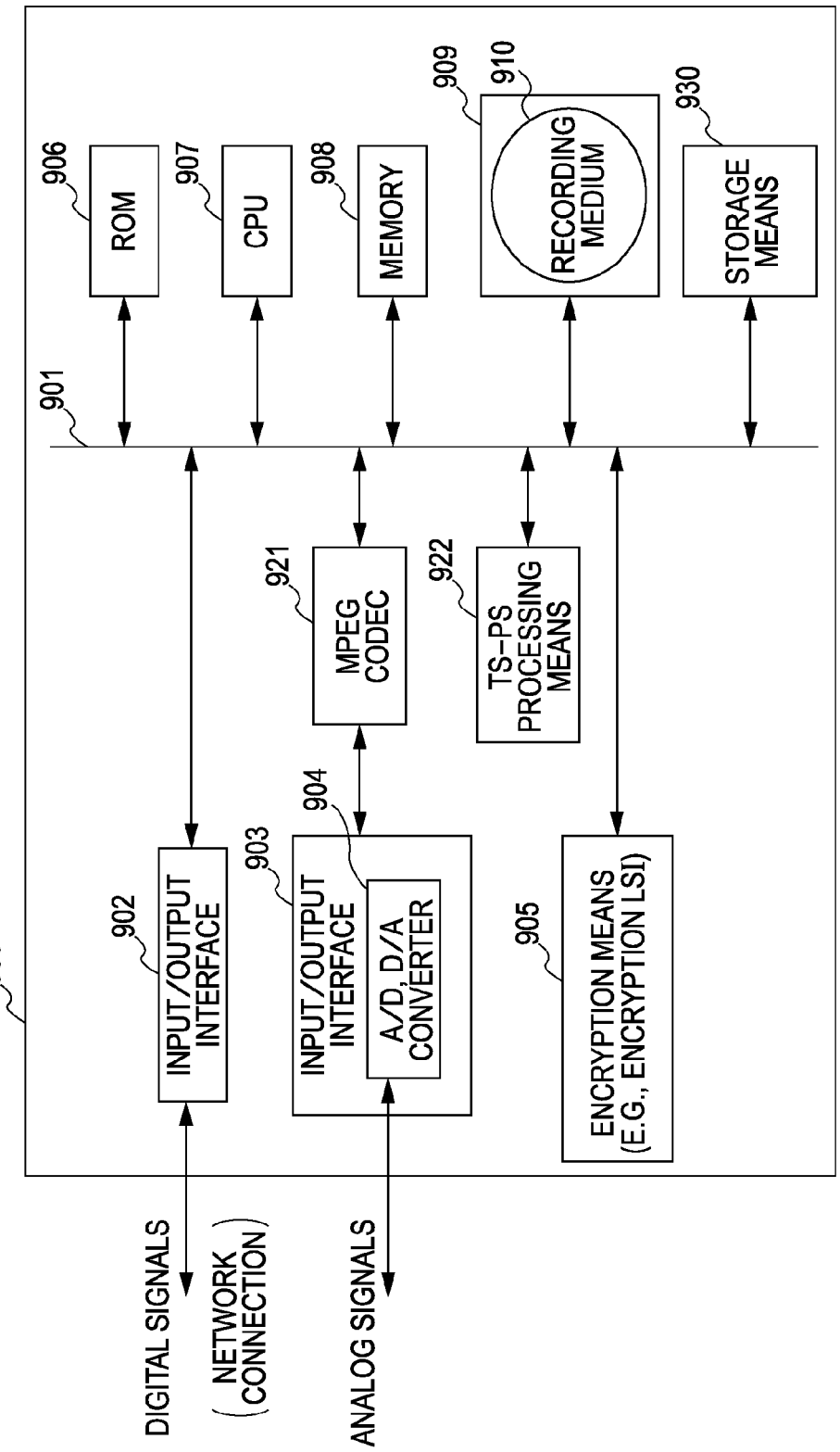
FIG. 21 is a diagram for describing a configuration example of an information processing device which is mounted with an information recording medium and executes reproduction processing or recording processing.

An information processing device 900 shown in FIG. 21 drives an information recording medium 910, and has a drive 909 for performing input/output of data play/play signals, a CPU 907 serving as control means for executing data processing following various programs, ROM 906 and memory 908 serving as storage region for programs, parameters, and the like, an input/output I/F 902 for input/output of digital signals, an input/output I/F 903 for input/output of analog signals and having an A/D, D/A converter 904, an MPEG codec 921 for encoding and decoding MPEG data, TS·PS processing means 922 for executing TS (Transport Stream)·PS (Program Stream) processing, encryption processing means 905 for executing various types of encryption processing, and storage means 930 such as a hard disk, with each of the blocks being connected by a bus 901.

In the event of reproducing AV stream data made up of MPEG-TS data from the information recording medium 910, data read out from the information recording medium 910 at the drive 909 is decrypted at necessary at the encryption processing means 905 and separated into various data of video, audio, captions, and so forth, by the TS•PS processing means 922.

Further, the digital data decoded at the MPEG codec 921 is converted into analog signals by the D/A converter 904 within the input/output I/F 903 and output. Also, in the event of performing digital output, the MPEG-TS data decrypted at the encryption processing means 905 is output as digital data via the input/output IF 902. Output in this case is performed to a digital interface such as for example, IEEE 1394, an Ethernet cable, a wireless LAN, or the like. In the event of handling network connection functions, the input/output I/F 902 has the functions of network connection.

Also, in the event of performing data conversion in the information processing device 900 into a format which the output destination device can receive, the separated video, audio, captions, and so forth, separated once at the TS·PS processing means 922, are subjected to rate conversion and codec conversion processing at the MPEG codec 921, and multiplexed into MPEG-TS or MPEG-TS at the TS·PS processing means 922 again, and this data is output from the digital input/output I/F 902. Also, conversion into multiplexed files with codecs other than MPEG may be performed under control of the CPU 907, and output from the digital input/output I/F 902.

The CPS unit management table (see FIG. 2) serving as CPS unit management information, and management data such as reproduce/copy control information corresponding to CPS units and so forth, are read out from the information recording medium 910 and then held in the memory 908. Key information for each CPS unit necessary for performing playback can be obtained from data saved in the memory.

Next, the actions of the information processing device 900 at the time of recording data which is new data such as generated data or obtained data, will be described. Two cases can be conceived for data to be recorded; digital signal input, and analog signal input. In the case of digital signal input, data input from the digital signal input/output I/F 902, and subjected to encryption processing by the encryption processing means 905 as necessary, is saved in the recording medium 910.

Also, in the event of converting the data format of the input digital signals for saving, conversion is made into the saving data format by the MPEG codec 921 and TS·PS processing means 922, and then subjected to appropriate encryption processing by the encryption processing means 905 and saved in the recording medium 910. In the event of analog signals, analog signals input to the input/output I/F 903 are converted into digital signals by the A/D converter 904, and converted into a codec used by the MPEG codec 921 at the time of recording.

Subsequently, conversion is made by the TS·PS processing means into AV multiplexed data which is the format of recorded data, and then subjected to appropriate encryption processing by the encryption processing means 905 and saved in the recording medium 910. Note that content management information is also created at the time of recording, and saved in the recording medium 910.

In the event of obtaining necessary information via external network with the information processing device 900, the obtained data is saved in the memory 908 in the information processing device 900. Saved information includes key information necessary for reproducing contents, data such as captions to be reproduced together at the time of reproducing contents, audio, still images and the like, contents managing information, usage rules for the reproducing device corresponding to content management information, and so forth.

Note that programs for executing reproducing processing and recording processing are stored in the ROM 906, and the memory 908 is used as necessary for saving data while processing.

Generating, obtaining, and recording processing of new data will be described. Execution programs or analyzable data is reading from the information recording medium 910 at the device 909 to the memory 908 and held, and the program is executed, or the data is analyzed, under control of the CPU 907.

Data newly generated or obtained is temporarily held in the memory 908, and is stored in the information recording medium 910 or storage means 930 such as a hard disk or the like, following user selection or a predetermined control sequence.

Note that programs for executing the reproducing processing and recording processing are held in the ROM 906, and during execution processing of the programs, the memory 908 is used as necessary for holding parameters and data, and as a work region. While FIG. 21 has been described with regard to a device configuration capable of recording and reproducing data, a configuration may be made with a device only with reproduction functions or a device only with recording functions, and the present invention is applicable to these devices as well.

The present invention has been described in detail with reference to particular embodiments. However, it is self-evident that one skilled in the art can make various modifications and substitutions to the embodiments without departing from the essence of the present invention. That is to say, the present invention has been disclosed in exemplary form, and should not be interpreted restrictively. Determination of the essence of the present invention should be made based on the Claims laid forth at the beginning.

The series of processing described in the description herein can be executed with a configuration of hardware, or software, or a combination thereof. In the case of executing processing with software, a program storing the processing sequence can be installed into the memory of the computer built into dedicated hardware and executed, or a program can be installed into a general-use computer, wherein various types of processing can be executed, and executed.

For example, the program can be recorded in advance on a hard disk or in ROM (Read Only Memory) serving as a recording medium. Alternatively, the program can be stored (recorded) temporarily or permanently onto a removable recording medium such as a flexible disk, CD-ROM (Compact Disc Read Only Memory), MO (Magneto optical) disk, DVD (Digital Versatile Disc), magnetic disk, or semiconductor memory. Such removable recording media can be provided as so-called packaged software.

Besides installing the program on the computer from the above-described removable recording media, the program can be wirelessly transferred to the computer from a download site, or can be transferred via cable to the computer via a network such as a LAN (Local Area Network) or the Internet, and the computer can receive the program transferred in such a manner and install the program onto a recording medium such as an internal hard disk.

The various processing described in the description herein is not restricted to being executed in time sequence according to the description, and can be executed in parallel or individually according to the processing capability of the device to execute the processing, or as needed. Also, system as used in the present description refers to a logical group of multiple devices, and is not limited to the various configurations being within one enclosed unit.

INDUSTRIAL APPLICABILITY

As described above, according to the configuration of the present invention, new data such as information which a user has generated or information which has been downloaded newly in relation to content information in increments of units stored in an information recording medium, in the form of encrypted data to which a unit key corresponding to a content management unit or a unit key corresponding to a new content management unit has been applied, as content management unit configuration data, so secure data management and usage management is realized for newly-generated data in the same way as with the original unit correlated data. Accordingly, applying the configuration of the present invention in a configuration wherein generating or obtaining of new data is performed enables usage management of new data to be effectively performed.

Further, according to the configuration of the present invention, in execution of a program included in information read from an information recording medium, the type of the information recording medium from which the program has been read is determined, and the program is executed under the condition that the type is a type set beforehand with permission for execution of the program, so execution of the program using a copied disk of the content, for example, will be rejected, and unauthorized usage of copied disks can be prevented.

Further, according to the configuration of the present invention, besides AV stream data files, navigation files as well are encrypted or set with tampering verification data and stored, so using a CPS-unit-compatible AV stream data file or navigation file applying applications other than licensed application, or performing processing such as modifying data or the like, on a device capable of using various applications such as a PC or the like, for example, can be prevented, and unauthorized use of CPS-unit-compatible data including navigation files can be eliminated.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing device comprising:
a processor;
a recording medium interface configured to read data from an information recording medium which stores data in increments of:
  (a) a first content management unit which includes first encrypted data that is encrypted by a first unit key that is set as a first encryption key; and
  (b) a second content management unit which includes second encrypted data that is encrypted by a second unit key that is set as a second, different encryption key; and
a memory device storing instructions which when executed by the processor, cause the processor to:
  (a) record new data which is either generated or obtained applying information obtained from the information recording medium;
  (b) obtain at least one of:
    (i) the first unit key, the first unit key corresponding to the first content management unit to which the obtained information belongs; and
    (ii) a third, different unit key which corresponds to a third, different content management unit to which the obtained information does not belong;
  (c) in response to the first unit key being obtained:
    (i) encrypt the new data applying the obtained first unit key; and
    (ii) execute recording processing with said encrypted new data as data configuring the first content management unit; and
  (d) in response to the third, different unit key being obtained:
    (i) encrypt the new data applying the obtained third, different unit key; and
    (ii) execute recording processing with the encrypted new data as data configuring the third, different content management unit.

2. The information processing device of claim 1, wherein the instructions, when executed by the processor, cause the processor to:
  (a) set a fourth content management unit corresponding to the new data; and
  (b) execute setting processing for a third encryption key serving as management information corresponding to the fourth content management unit including the new data.

3. The information processing device of claim 1, wherein the data processing unit is configured to:
  (a) set a fifth content management unit corresponding to the new data; and
  (b) execute setting processing for content usage control information serving as management information corresponding to the fifth content management unit including the new data.

4. The information processing device of claim 1, wherein the instructions, when executed by the processor, cause the processor to execute writing processing of the new data to a region stipulated by a program included in the information obtained from the information recording medium.

5. The information processing device of claim 1, wherein the instructions, when executed by the processor, cause the processor to, in a case of storing the new data in storage means other than an information recording medium from which the obtained information has been obtained, execute processing for storing the new data correlated with identification information of the information recording medium from which the obtained information has been obtained.

6. The information processing device of claim 1, wherein the instructions, when executed by the processor, cause the processor to:
  (a) execute encryption processing of an AV stream data file including new data and a navigation file including control information or a program to be applied to playing processing of the AV stream data; and
  (b) execute recording processing of new data to storage means.

7. The information processing device of claim 6, wherein the instructions, when executed by the processor, cause the processor to apply a unit key corresponding to a sixth content management unit as a fourth encryption key to be applied to the encryption processing.

8. The information processing device of claim 6, wherein the instructions, when executed by the processor, cause the processor to execute encryption processing applying, as an encryption key or encryption key generating information, information which can only be obtained by an application licensed to execute processing regarding the first content management unit or the third, different content management unit.

9. The information processing device of claim 8, wherein the information which can only be obtained by a licensed application is information including a device ID as an identifier unique to the device in which the application is installed.

10. The information processing device of claim 1, wherein the instructions, when executed by the processor, cause the processor to:
  (a) generate a hash value for tampering verification with regard to at least one of an AV stream data file including new data, and a navigation file including control information or a program to be applied to playing processing of the AV stream data; and
  (b) record the hash value in a storage means.

11. The information processing device of claim 10, wherein the instructions, when executed by the processor, cause the processor to:
  (a) execute data tampering verification processing based on the hash value set for an AV stream data file including new data or a navigation file, at the time of using the file; and
  (b) execute usage processing of the files under the condition that there is no tampering.

12. The information processing device of claim 1, wherein the instructions, when executed by the processor, cause the processor to execute recording processing of a navigation file, including control information or a program to be applied to playing processing of AV stream data including new data, to storage means, as a file to which an electronic signature has been appended for tampering verification.

13. The information processing device of claim 12, wherein the instructions, when executed by the processor, cause the processor to:
  (a) execute data tampering verification processing based on the electronic signature set for AV stream data file including new data or the navigation file, at the time of using the file; and
  (b) execute usage processing of the files under the condition that there is no tampering.

14. A method of operating an information processing device including instructions, the method comprising:
  (a) causing a processor to execute the instructions to read data from an information recording medium which stores data in increments of:
    (i) a first content management unit which includes first encrypted data that is encrypted by a first unit key that is set as a first encryption key; and
    (ii) a second content management unit which includes second encrypted data that is encrypted by a second unit key that is set as a second, different encryption key;
  (b) causing the processor to execute the instructions to record new data which is either generated or obtained applying information obtained from the information recording medium;
  (c) causing the processor to execute the instructions to obtain at least one of:
    (i) the first unit key, the first unit key corresponding to the first content management unit to which the obtained information belongs; and
    (ii) a third, different unit key which corresponds to a third content management unit to which the obtained information does not belong;
  (d) in response to the first unit key being obtained:
    (i) causing the processor to execute the instructions to encrypt the new data applying the obtained first unit key; and
    (ii) causing the processor to execute the instructions to execute processing with said encrypted new data as data configuring the first content management unit; and
  (e) in response to the third, different unit key being obtained:
    (i) causing the processor to execute the instructions to encrypt the new data applying the obtained third, different unit key; and
    (ii) causing the processor to execute the instructions to execute recording processing with the encrypted new data as data configuring the third, different content management unit.

15. The method of claim 14, which includes:
(a) causing the processor to execute the instructions to set a fourth content management unit corresponding to the new data; and
(b) causing the processor to execute the instructions to execute setting processing for an encryption key serving as management information corresponding to the content management unit including the new data.

16. The method of claim 14, which includes:
(a) causing the processor to execute the instructions to set a fifth content management unit corresponding to the new data; and
(b) causing the processor to execute the instructions to execute setting processing for content usage control information serving as management information corresponding to the fifth content management unit including the new data.

17. The method of claim 14, which includes causing the processor to execute the instructions to execute writing processing of the new data to a region stipulated by a program included in the information obtained from the information recording medium.

18. The method of claim 14, which includes in a case of storing the new data in storage means other than an information recording medium from which the obtained information has been obtained, causing the processor to execute the instructions to execute processing for storing the new data correlated with identification information of the information recording medium from which the obtained information has been obtained.

19. The method of claim 14, which includes:
(a) causing the processor to execute the instructions to execute encryption processing of an AV stream data file including new data and a navigation file including control information or a program to be applied to playing processing of the AV stream data; and
(b) causing the processor to execute the instructions to execute recording processing of new data to storage means.

20. The method of claim 19, which includes applying a unit key corresponding to a content management unit as an encryption key to be applied to the encryption processing.

21. The method of claim 19, which includes applying, as an encryption key or encryption key generating information, information which can only be obtained by an application licensed to execute processing regarding the content management unit.

22. The method of claim 21, which includes wherein the information which can only be obtained by a licensed application is information including a device ID as an identifier unique to the device in which the application is installed.

23. The method of claim 14, which includes:
(a) causing the processor to execute the instructions to generate of a hash value for tampering verification with regard to at least one of an AV stream data file including new data, and a navigation file including control information or a program to be applied to playing processing of the AV stream data; and
(b) causing the processor to execute the instructions to record of the hash value in storage means.

24. The method of claim 23, which includes:
(a) causing the processor to execute the instructions to execute data tampering verification processing based on the hash value set for the AV stream data file including new data or the navigation file, at the time of using the file; and
(b) causing the processor to execute the instructions to execute usage processing of the files under the condition that there is no tampering.

25. The method of claim 14, which includes causing the processor to execute the instructions to execute recording processing of a navigation file, including control information or a program to be applied to playing processing of AB stream data including new data, to storage means, as a file to which an electronic signature has been appended for tampering verification.

26. The method of claim 25, which includes causing the processor to execute the instructions to execute data tampering verification processing based on the electronic signature set for the AV stream data file including new data or the navigation file, at the time of using the file, and executing of usage processing of the files under the condition that there is no tampering.

27. A non-transitory machine-accessible and readable storage medium storing instructions structured to cause an information processing device to:
(a) read data from an information recording medium which stores data in increments of:
(i) a first content management unit which includes first encrypted data that is encrypted by a first unit key that is set as a first encryption key; and
(ii) a second content management unit which includes second encrypted data that is encrypted by a second unit key that is set as a second, different encryption key; and
(b) record new data which is either generated or obtained applying information obtained from the information recording medium;
(c) obtain at least of:
(i) the first unit key, the first unit key corresponding to the first content management unit to which the obtained information belongs; and
(ii) a third, different unit key which corresponds to a third, different content management unit to which the obtained information does not belong;
(d) in response to the first unit key being obtained:
(i) encrypt the new data applying the obtained first unit key; and
(ii) execute recording processing with said encrypted new data as data configuring the first content management unit; and
(e) in response to the third, different unit key being obtained:
(i) encrypt the new data applying the obtained third, different unit key; and
(ii) execute recording processing with the encrypted new data as data configuring the third, different content management unit.

28. The non-transitory machine-accessible and readable storage medium of claim 27, wherein the instructions are further structured to cause the information processing device to:
(a) encrypt an AV stream data file including new data, and a navigation file including control information or a program to be applied to playing processing of AV stream data including new data; and
(b) execute recording to recording means.

29. The non-transitory machine-accessible and readable storage medium of claim 27, wherein the instructions are further structured to cause the information processing device to:

(a) record, to storage means, tampering verification data regarding at least one of an AV stream data file including new data, and a navigation file including control information or a program to be applied to playing processing of AV stream data including new data; and
(b) execute recording to recording means.

30. The non-transitory machine-accessible and readable storage medium of claim 27, wherein the instructions are further structured to cause the information processing device to:

(a) execute data tampering verification processing based on the tampering verification data set for the AV stream data file including new data or the navigation file, at the time of using the file; and
(b) execute usage processing of the files under the condition that there is no tampering.

* * * * *